(12) United States Patent
Fischer et al.

(10) Patent No.: US 9,137,672 B2
(45) Date of Patent: Sep. 15, 2015

(54) METHOD AND SYSTEM FOR COEXISTENCE BETWEEN 20 MHZ AND 40 MHZ OVERLAPPING BASIC SERVICE SETS (OBSS) IN WIRELESS LOCAL AREA NETWORKS

(75) Inventors: Matthew Fischer, Mountain View, CA (US); Jason Trachewsky, Menlo Park, CA (US); Vinko Erceg, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1401 days.

(21) Appl. No.: 11/952,202

(22) Filed: Dec. 7, 2007

(65) Prior Publication Data

US 2008/0137627 A1 Jun. 12, 2008

Related U.S. Application Data

(60) Provisional application No. 60/874,018, filed on Dec. 9, 2006, provisional application No. 60/985,560, filed on Nov. 5, 2007.

(51) Int. Cl.
*H04W 28/12* (2009.01)
*H04W 16/14* (2009.01)
(Continued)

(52) U.S. Cl.
CPC .............. *H04W 16/14* (2013.01); *H04L 47/14* (2013.01); *H04W 28/0215* (2013.01); *H04W 28/20* (2013.01); *H04W 28/18* (2013.01); *H04W 84/12* (2013.01)

(58) Field of Classification Search
CPC . H04W 28/0215; H04W 28/12; H04W 28/20; H04L 47/14

USPC .......................................... 370/338; 455/26.1
See application file for complete search history.

(56) References Cited

U.S. PATENT DOCUMENTS

| | | | | |
|---|---|---|---|---|
| 5,175,537 | A | * | 12/1992 | Jaffe et al. ..................... 370/447 |
| 7,136,361 | B2 | * | 11/2006 | Benveniste ................ 370/310.2 |

(Continued)

FOREIGN PATENT DOCUMENTS

| | | |
|---|---|---|
| KR | 10-2006-0029046 | 4/2006 |
| WO | WO02093831 | 11/2002 |
| WO | WO2006045097 | 4/2006 |

OTHER PUBLICATIONS

IEEE P802.11n/D3.00, Part 11: Wireless LAN Medium Access Control (MAC) and Physical Layer (PHY) Specifications, pp. 1-9, 204-219, and 301-302, Sep. 2007.

(Continued)

*Primary Examiner* — Aaron Strange
(74) *Attorney, Agent, or Firm* — Garlick & Markison; Bruce E. Garlick

(57) ABSTRACT

Aspects of a method and system for coexistence between 20 MHz and 40 MHz OBSSes in WLANs. Aspects of a system may include a receiving device, such as a WLAN station (STA), which enables reception of an information frame, such as a management frame, via a wireless communication medium. The receiving device may be associated with a wireless network device group, such as a basic service set (BSS). The information frame received by the receiving device may transmitted by a transmitting device, such as a transmitting access point (AP), which is associated with a foreign wireless network device group, for example a foreign BSS. The receiving device may be reconfigured to restrict RF channel bandwidth utilized for transmitting and/or receiving signals via the wireless communication medium based on the received information frame.

23 Claims, 17 Drawing Sheets

(51) Int. Cl.
*H04L 12/801* (2013.01)
*H04W 28/20* (2009.01)
*H04W 28/02* (2009.01)
*H04W 28/18* (2009.01)
*H04W 84/12* (2009.01)

(56) References Cited

U.S. PATENT DOCUMENTS

| | | | | |
|---|---|---|---|---|
| 7,206,840 | B2* | 4/2007 | Choi et al. | 709/225 |
| 7,664,832 | B1* | 2/2010 | Ulvenes et al. | 709/219 |
| 7,684,758 | B2* | 3/2010 | Zhu | 455/63.1 |
| 8,126,502 | B2* | 2/2012 | Trainin | 455/552.1 |
| 8,462,709 | B2* | 6/2013 | Nanda et al. | 370/329 |
| 2004/0157597 | A1* | 8/2004 | Comer et al. | 455/426.1 |
| 2006/0159003 | A1* | 7/2006 | Nanda et al. | 370/203 |
| 2007/0081097 | A1* | 4/2007 | Ochi | 348/445 |
| 2007/0268872 | A1* | 11/2007 | Cromer et al. | 370/338 |
| 2008/0268855 | A1* | 10/2008 | Hanuni et al. | 455/445 |

OTHER PUBLICATIONS 802 11 Working Group: "IEEE 802.11n Part 7: Frame Format," IEEE P802.11N/D1.4, Sep. 2006, [Online] Sep. 4, 2006, pp. 9-66, XP0025006875, Retrieved from the Internet: URL:http://www.ee.ust.hk/eejinjie/research_files/LDPC_files/invovle d%20 standards/11n-1.04.pdf> [retrieved on Dec. 1, 2008].

A. Kasher: "TGn LB84 Submission on Channel Selection in 20/40 MHz Mode," IEEE 802.11-06/1413r2, Nov. 8, 2007, pp. 1-10, XP002616397, retrieved from the Internet: URL:https://mentor.ieee.org/802.11/documents?n=4&is_group=000n&is_year=2006 [retrieved on Jan. 11, 2011].

EPO Communication dated May 13, 2011 in Application No. 07023896.9-2412 / 1931086.

* cited by examiner

METHOD AND SYSTEM FOR COEXISTENCE BETWEEN 20 MHZ AND 40 MHZ OVERLAPPING BASIC SERVICE SETS (OBSS) IN WIRELESS LOCAL AREA NETWORKS

CROSS-REFERENCE TO RELATED APPLICATIONS/INCORPORATION BY REFERENCE

This application makes reference to, claims priority to, and claims the benefit of:
U.S. Provisional Application Ser. No. 60/874,018, filed on Dec. 9, 2006; and
U.S. Provisional Application Ser. No. 60/985,560, filed on Nov. 5, 2007.

Each of the above stated applications is hereby incorporated herein by reference in its entirety.

FIELD OF THE INVENTION

Certain embodiments of the invention relate to communication networks. More specifically, certain embodiments of the invention relate to a method and system for coexistence between 20 MHz and 40 MHz overlapping basic service sets (OBSS) in wireless local area networks.

BACKGROUND OF THE INVENTION

IEEE 802.11 describes a communication architecture, which may enable computing devices to communicate via wireless local area networks (WLANs). One of the building blocks for the WLAN is the basic service set (BSS). A BSS may comprise a plurality of computing devices, or stations (STA), which may communicate wirelessly via one or more RF channels within a coverage area. The span of a coverage area may be determined based on the distance over which a source STA may transmit data via an RF channel, which may be received by a destination STA.

An independent BSS (IBSS) refers to a BSS, which comprises a set of STAs, which may communicate with each over within the coverage area for the BSS. In an IBSS each STA may engage in direct communication with any of the other STAs within the IBSS provided that each STA is within the coverage area of the other. An IBSS may be referred to as an ad hoc network.

An infrastructure BSS refers to a BSS, which may be associated with an extended service set (ESS). The ESS is identified by a service set identifier (SSID). An infrastructure BSS may also be referred to as a BSS. Each of the BSSes within an ESS is identified by a BSS identifier (BSSID). Thus, STAs within a BSS generally determine their association within the BSS based on a BSSID and an SSID.

Each BSS comprises a plurality of STAs and an access point (AP). The AP forms an association with each of the STAs within the BSS. The AP identifies each association by an association identifier (AID). The AP may provide communication services to STAs within a BSS based on the presence of an established association. The AP may comprise STA functionality.

STAs within a BSS or IBSS may negotiate operating parameters, which the STAs may utilize to enable communications with other STAs within the BSS or IBSS. The operating parameters may include determination of an RF channel bandwidth that is to be utilized between communicating STAs. An RF channel utilized for communication between STAs may utilize a 20 MHz bandwidth or a 40 MHz bandwidth. The operating parameters may also include assignment(s) of RF channels to be utilized by communicating STAs within a given BSS or IBSS. Each RF channel may comprise a distinct range of frequencies as determined by applicable IEEE 802.11 specifications. A 20 MHz RF channel may comprise a single 20 MHz channel. A 40 MHz RF channel may comprise a 20 MHz primary channel and a 20 MHz secondary channel.

The operating parameters may also include specification of a modulation method that is to be utilized by STAs when transmitting data via the assigned RF channel. For example, a STA, for which communications are based on IEEE 802.11g specifications may utilize complementary code keying (CCK) modulation when transmitting data via an RF channel, while a STA, for which communications are based on IEEE 802.11n specifications may utilize orthogonal frequency division multiplexing (OFDM) when transmitting data via an RF channel.

STAs, which utilize IEEE 802.11 specifications may utilize a collision sense multiple access with collision avoidance (CSMA/CA) method to gain access to the wireless medium. Collisions may occur in a wireless communication medium when multiple STAs, within an RF transmission coverage area, concurrently utilize overlapping RF channel(s) in an attempt to transmit data. RF channels may overlap when at least one frequency is common between two or more of the concurrently overlapping RF channels. Collisions may result in unsuccessful transfer of data via the wireless communication medium, which may in turn result in reduced data transfer rates for data transmitted by the STAs.

STAs associated in a BSS_1 may communicate via a 40 MHz RF channel, RF_1. STAs associated in a BSS_2 may communicate via a 20 MHz RF channel, RF_2. When at least a portion of the RF_2 channel is also contained within the RF_1 channel, the BSSes BSS_1 and BSS_2 may be referred to as overlapping BSSes (OBSS). An OBSS may occur when at least one of the STAs associated in BSS_1 is within the RF coverage area for BSS_2 and/or when at least one of the STAs associated in BSS_2 is within the RF coverage area for BSS_1. For example, at least a portion of the RF_2 channel may correspond to at least a portion of the secondary channel for the RF_1 channel. In this case, collisions may result when STAs within BSS_1 attempt to communicate concurrently with communications between STAs within BSS_2.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for coexistence between 20 MHz and 40 MHz overlapping basic service sets (OBSS) in wireless local area networks, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for coexistence between 20 MHz and 40 MHz overlapping basic service sets (OBSS) in wireless local area networks (WLAN). In an exemplary WLAN, which operates in accordance with IEEE 802.11 specifications, a WLAN station (STA) or WLAN access point (AP) may receive management frames, for example beacon frames, via a wireless communication medium. The STA and/or AP may be capable of communicating by utilizing 20 MHz RF channels or 40 MHz RF channels selected from a range of distinct RF channels. In an exemplary embodiment of the invention, the management frames may comprise information, which causes the receiving STA or AP to restrict communication to those utilizing 20 MHz RF channels for at least a determined minimum period of time. In another exemplary embodiment of the invention, a lack of expected information within a management frame may cause the receiving STA or AP to restrict communications to those utilizing 20 MHz RF channels for at least a determined minimum period of time. In other exemplary embodiments of the invention, received management frames may cause the receiving STA or AP to restrict communications to those utilizing 20 MHz bandwidth for selected RF channels.

Figure 1:
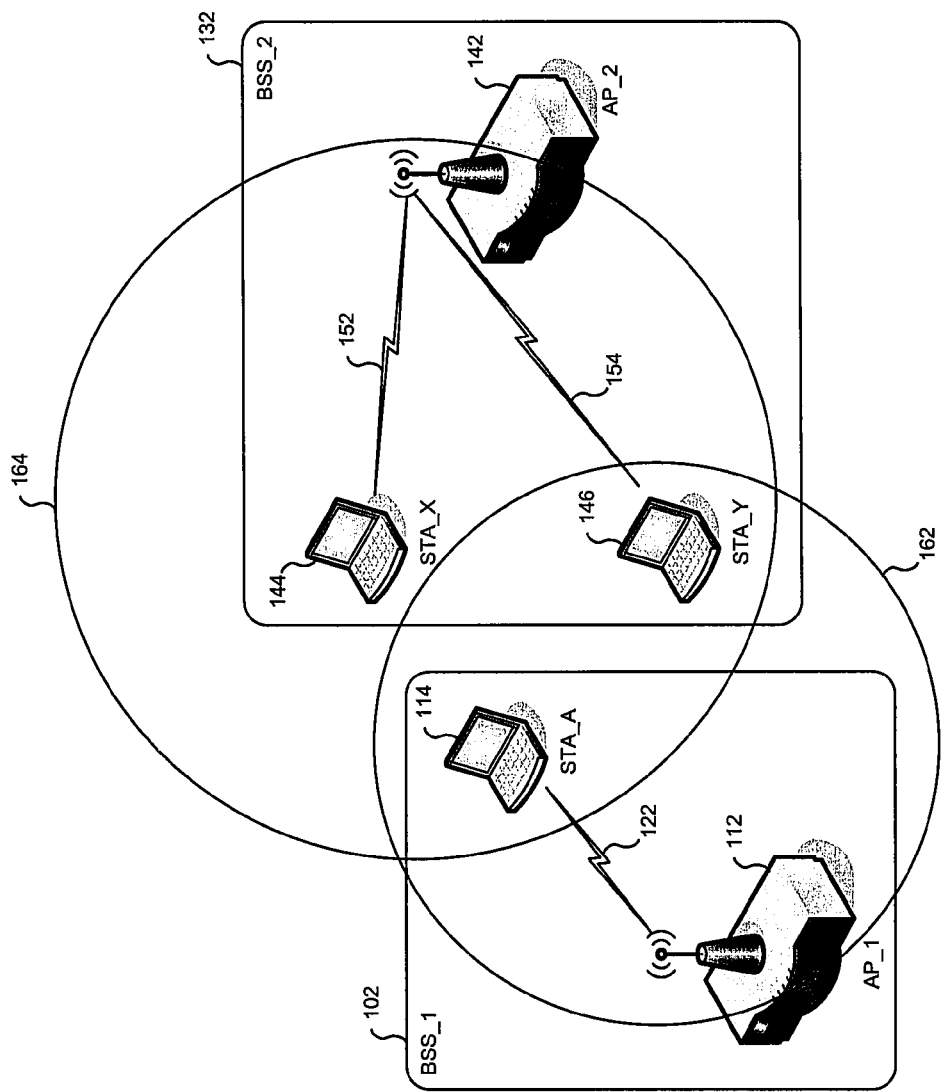
FIG. 1 is a diagram illustrating an exemplary overlapping basic service set (OBSS) within a WLAN, which may be utilized in connection with an embodiment of the invention.

FIG. 1 is a diagram illustrating an exemplary overlapping basic service set (OBSS) within a WLAN, which may be utilized in connection with an embodiment of the invention. Referring to FIG. 1, there is shown a BSS_1 102 and a BSS_2 132. The BSS_1 102 comprises an AP_1 112 and a WLAN STA STA_A 114. The BSS_2 132 comprises an AP_2 142, a STA_X 144 and an STA_Y 146.

The AP_1 112 may communicate with the STA_A 114 via a 20 MHz RF channel 122. The AP_1 112 may negotiate with the STA_A 114 to establish an RF channel assignment based on, for example, the transmission of beacon frames. The communications capabilities of the AP_1 112 and/or the STA_A 114 may enable communications utilizing 20 MHz bandwidth RF channels. The RF channel assignment may comprise a center frequency, which may be utilized in connection with the 20 MHz RF channel bandwidth to determine the range of frequencies utilized by RF channel 122.

The AP_2 142 may communicate with the STA_X 144 via a 40 MHz RF channel 152. The AP_2 142 may communicate with the STA_Y 146 via a 40 MHz RF channel 154. The AP_2 142 may negotiate with the STA_X 144 to establish an RF channel assignment and RF channel bandwidth based on, for example, the transmission of beacon frames. The RF channel assignment may comprise a center frequency, which may be utilized in connection with the 40 MHz RF channel bandwidth to determine the range of frequencies utilized by the RF channel 152. The center frequency may correspond to the center frequency of the primary or secondary channel portion of 40 MHz RF channel, for example. The AP_2 142 may negotiate with the STA_Y 146 to establish an RF channel assignment and RF channel bandwidth based on, for example, the transmission of beacon frames. The 40 MHz RF channel 154 may comprise at least a portion of the RF channel 152. The communications capabilities of the AP_2 142, the STA_X 144 and/or the STA_Y 146 may enable communications utilizing 20 MHz bandwidth or 40 MHz bandwidth RF channels. The AP_2 142 may be referred to as a high throughput (HT) AP. STA_X 144 and/or STA_Y 146 may be referred to as an HT STA.

In operation, the RF coverage area for signals transmitted by the AP_1 112 may comprise the coverage area 162. Included within the coverage area 162 are the STA_A 114 (within BSS_1 102) and the STA_Y 146 (within BSS_2 132). The RF coverage area for signals transmitted by the STA_X 144 may comprise the coverage area 164. Included within the coverage area 164 are the STA_A 114, the STA_Y 146 and the AP_2 142 (within BSS_2 132). Thus, BSS_1 102 and the BSS_2 132 may comprise OBSSes.

The AP_1 112 may send data frames and/or management frames to the STA_A 114 via the 20 MHz RF channel 122. The management frames transmitted by the AP_1 112 may be selected from a set of management frame types, which may comprise beacon frames, association frames, disassociation frames, reassociation frames, probe frames, action frames and coexistence frames. The signals transmitted by the AP_1 112 via RF channel 122 may also be received by the STA_A 114 and the STA_Y 146, which are located within the coverage area 162. The data frames and/or management frames transmitted via the RF channel 122 may utilize CCK modulation.

The STA_X 144 may send data frames and/or management frames to the AP_2 142 via the 40 MHz RF channel 152. The signals transmitted by the STA_X 144 via RF channel 152 may also be received by the AP_2 142, the STA_Y 146 and the STA_A 114, which are located within the coverage area 164. The data frames and/or management frames transmitted via the RF channel 152 may utilize OFDM.

Collisions may occur during concurrent transmissions by the AP_1 112 and the STA_X 144 when the RF channel 122 comprises at least a portion of the secondary channel portion of RF channel 152, for example. The STA_A 114 may not detect signals and/or data frames, which are transmitted by transmitted via RF channel 152 utilizing OFDM. Prior to commencing transmission of signals, the STA_X 144 may have performed a request to send (RTS) and clear to send (CTS) frame exchange sequence with the AP_2 142 via the primary channel portion of RF channel 152. The STA_A 114, being configured to receive signals within the secondary channel portion of RF channel 152, may not detect the RTS/CTS frame exchange sequence between the STA_X 144 and the AP_2 142. Consequently, the STA_A 114 may enable the AP_1 112 to commence transmission of signals via the RF channel 122 while the STA_X 114 is transmitting signals via the RF channel 152.

In an exemplary embodiment of the invention, the STA_Y 146 may receive management frames (for example, beacon frames) and/or data frames, which are transmitted by the AP_1 112 to the STA_A 114 via the RF channel 122. A received frame may comprise a quality of service (QoS) bit but may not comprise an HT capabilities information element (IE). The value of the QoS bit may indicate that the STA may be operating in a BSS within the RF channel 122 that may be specified for prioritized delivery based on a service class definition. The value of the QoS bit (for example, QoS_Bit=YES) may indicate that the STA may transmit frames during an SP. When the STA_Y 146 receives the frame, the STA_Y 146 may be reconfigured to utilize 20 MHz RF channels. The STA_Y 146 may initiate a disassociation frame exchange sequence with the AP_2 142 followed by a reassociation frame sequence. Following the reassociation, the RF channel 154 may utilize a 20 MHz channel bandwidth. During the reassociation frame sequence, the STA_Y 146 may transmit information, such as an HT capabilities IE, which indicates that the STA_Y 146 has reconfigured for 20 MHz channel bandwidth operation. The HT capabilities IE may comprise information, for example a 40 MHz_Intolerant indication in which 40 MHz_Intolerant=YES, which may indicate that the STA_Y 146 requests that the AP_2 142 reconfigure for 20 MHz channel bandwidth operation. The HT capabilities IE may also comprise an indication (for example, Supported_Channel_Width=20 MHz), which enables the AP_2 142 to determine that the STA_Y 146 supports 20 MHz channel bandwidth operation.

In the exemplary embodiment of the invention as described above, the STA_Y 146 may receive a frame, which comprises an HT capabilities IE. The HT capabilities IE may comprise information, for example a 40 MHz_Intolerant indication in which 40 MHz_Intolerant=YES. Upon reception of this frame, the STA_Y 146 may reconfigure for 20 MHz channel bandwidth operation. The STA_Y 146 may perform a disassociation/reassociation sequence as described above.

In the exemplary embodiment of the invention as described above, the STA_Y 146 may maintain state information related to the reconfiguration for 20 MHz channel bandwidth operation. The stored state information may enable the STA_Y 146 to remain configured for 20 MHz channel bandwidth operation for a determined minimum time period. When a subsequent beacon frame is received, within the determined minimum time period, which comprises a QoS_Bit=YES and does not comprise an HT capabilities IE, a timer value may be reset and the STA_Y 146 may remain configured for 20 MHz channel bandwidth operation for a determined minimum time period subsequent to receipt of the subsequent beacon frame. Similarly, when a subsequent beacon frame is received, within the determined minimum time period, which comprises an HT capabilities IE in which 40 MHz_Intolerant=YES, the timer value may also be reset and the STA_Y 146 may remain configured for 20 MHz channel bandwidth operation for a determined minimum time period subsequent to receipt of the subsequent beacon frame.

When a subsequent beacon frame as described above is not received prior to the end of the determined minimum time period, the STA_Y 146 may be reconfigured for 40 MHz channel bandwidth operation. The STA_Y 146 may initiate a disassociation frame exchange sequence with the AP_2 142 followed by a reassociation frame sequence. Following the reassociation, the RF channel 154 may utilize a 40 MHz channel bandwidth. During the reassociation frame sequence, the STA_Y 146 may transmit information, such as an HT capabilities IE, which indicates that the STA_Y 146 has reconfigured for 40 MHz channel bandwidth operation. The HT capabilities IE may comprise information, for example a 40 MHz_Intolerant indication in which 40 MHz_Intolerant=NO, which may indicate that the STA_Y 146 does not request that the AP_2 142 reconfigure for 20 MHz channel bandwidth operation. The HT capabilities IE may also comprise an indication (for example, Supported_Channel_Width=40 MHz), which enables the AP_2 142 to determine that the STA_Y 146 supports 40 MHz channel bandwidth operation.

Figure 2:
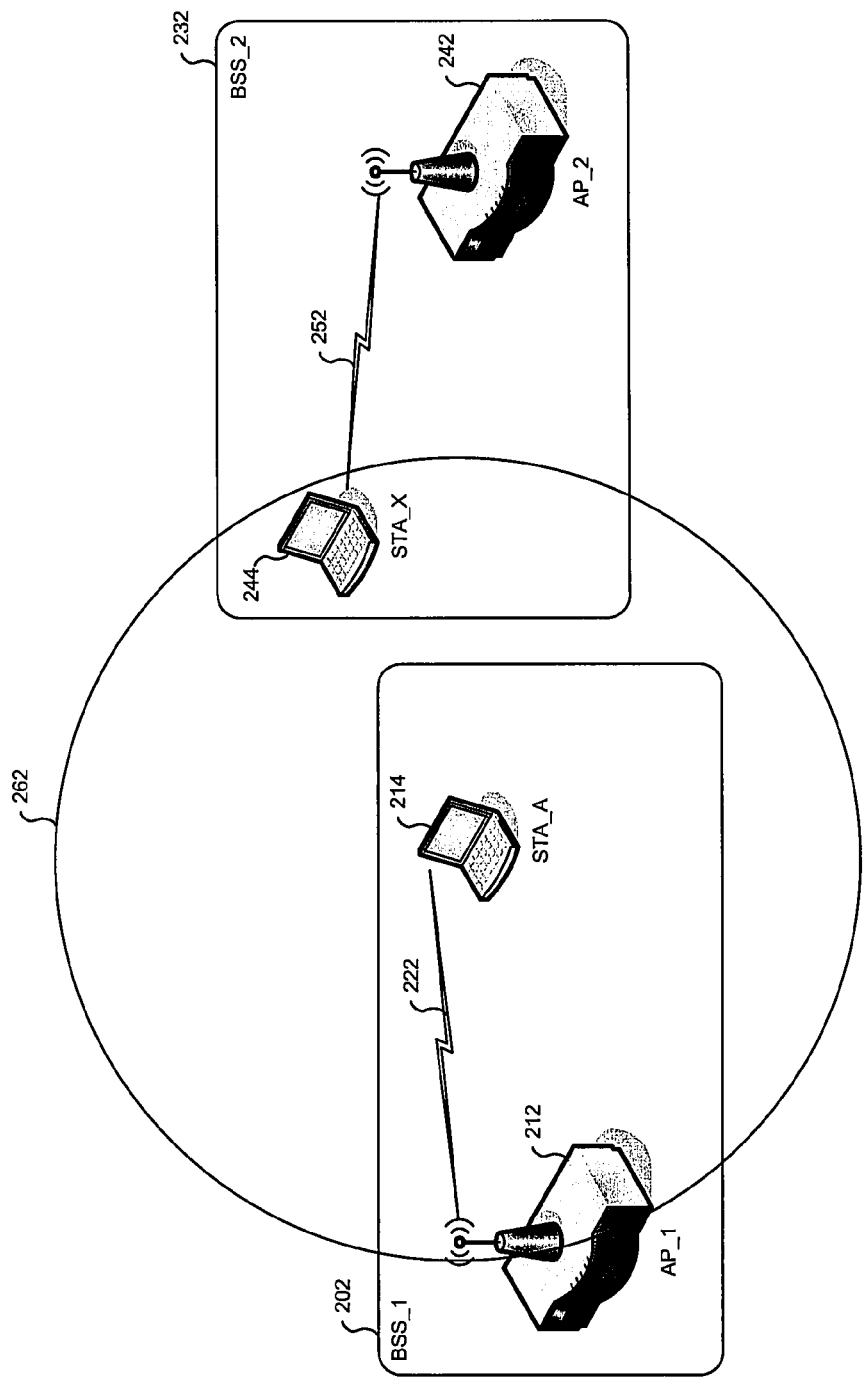
FIG. 2 is a diagram illustrating an exemplary overlapping basic service set (OBSS) within a WLAN, which may be utilized in connection with an embodiment of the invention.

FIG. 2 is a diagram illustrating an exemplary overlapping basic service set (OBSS) within a WLAN, which may be utilized in connection with an embodiment of the invention. Referring to FIG. 2, there is shown a BSS_1 202 and a BSS_2 232. The BSS_1 202 comprises an AP_1 212 and a STA_A 214. The BSS_2 232 comprises an AP_2 242 and a STA_X 244. The AP_1 212 may communicate with STA_A 214 via a 20 MHz RF channel 122. The AP_2 242 may communicate with STA_X 244 via a 40 MHz RF channel 252. The AP_2 242 may be referred to as an HT AP. The STA_X 244 may be referred to as an HT STA.

In operation, the RF coverage area for signals transmitted by the STA_A 214 may comprise the coverage area 262. Included within the coverage area 262 are AP_1 212 (within BSS_1 202) and STA_X 244 (within BSS_2 232). Thus, BSS_1 202 and BSS_2 232 may comprise OBSSes.

In an exemplary embodiment of the invention, the STA_X 244 may receive management frames and/or data frames, which are transmitted by the STA_A 214. The STA_X 244 may inspect the received frames to determine the BSSID associated with the received frame. The STA_X 244 may determine that the BSSID=202 associated with the received frame was sent by a STA, which is not associated with the BSS_2 232.

In an exemplary embodiment of the invention as described above, the STA_X 244 may attempt to determine whether it is able to determine HT capabilities information for BSS_1 202, which may be identified by BSSID=202. When the STA_X 244 is not able to determine the HT capabilities for BSS_1 202, the STA_X 244 may initiate a disassociation frame exchange sequence with the AP_2 242 followed by a reassociation frame sequence. Following the reassociation, the RF channel 252 may utilize a 20 MHz channel bandwidth. During the reassociation frame sequence, the STA_X 244 may transmit information, such as an HT capabilities IE, which indicates that the STA_X 244 has reconfigured for 20 MHz channel bandwidth operation. The HT capabilities IE may comprise information, for example a 40 MHz_Intolerant indication in which 40 MHz_Intolerant=YES, which may indicate that the STA_X 244 requests that the AP_2 242 reconfigure for 20 MHz channel bandwidth operation. The HT capabilities IE may also comprise an indication (for example, Supported_Channel_Width=20 MHz), which enables the AP_2 242 to determine that the STA_X 244 supports 20 MHz channel bandwidth operation.

In another exemplary embodiment of the invention as described above, the STA_X 244 may receive management frames and/or data frames, which are transmitted by the STA_A 214. The STA_X 244 may receive the frame via the secondary channel portion of RF channel 252. The STA_X 244 may inspect the received frames to determine the BSSID associated with the received frame. The STA_X 244 may determine that the BSSID associated with the received frame, BSSID=202, was sent by a STA, which may not be associated with BSS_2 232. The STA_X 244 may inspect the received frames to determine the transmitting station address (TA) for the STA, which transmitted the received frame. The STA_X 244 may determine that the TA identifies the STA_A 214. The STA_X 244 may transmit a management frame, for example a probe request frame, to the STA_A 214 to request that the STA_A 214 report operational and/or configuration information to the STA_X 244. The probe request frame transmitted by the STA_X 244 may, for example, be transmitted via the secondary channel portion of the RF channel 252 and received at the STA_A 214 via the RF channel 222.

The STA_A 214 may respond to the received probe request frame by transmitting a probe response frame. The probe response frame may be transmitted via RF channel 222. For an HT-capable STA_A 214, the probe response frame may comprise an HT capabilities IE. The HT capabilities IE may comprise a 40 MHz_Intolerant indication in which 40 MHz_Intolerant=YES, which may indicate that the STA_A 214 requests that the recipient STA_X 244 reconfigure for 20 MHz channel bandwidth operation. The HT capabilities IE may also comprise an indication (for example, Supported_Channel_Width=20 MHz), which enables the STA_X 244 to determine that the STA_A 214 supports 20 MHz channel bandwidth operation.

The STA_X 244 may receive the probe response frame the secondary channel portion of RF channel 252, for example. The STA_X 244 may inspect the received probe response frame to determine whether the received frame comprises an HT capabilities IE. When the STA_X 244 determines that the received probe response frame does not comprise an HT capabilities IE, the STA_X 244 may initiate a disassociation frame exchange sequence with AP_2 242 followed by a reassociation frame sequence. Following the reassociation, the RF channel 252 may utilize a 20 MHz channel bandwidth. During the reassociation frame sequence, the STA_X 244 may transmit information, such as an HT capabilities IE, which indicates that the STA_X 244 has reconfigured for 20 MHz channel bandwidth operation. The HT capabilities IE may comprise information, for example a 40 MHz_Intolerant indication in which 40 MHz_Intolerant=YES, which may indicate that the STA_X 244 requests that AP_2 242 reconfigure for 20 MHz channel bandwidth operation. The HT capabilities IE may also comprise an indication (for example, Supported_Channel_Width=20 MHz), which enables AP_2 242 to determine that the STA_X 244 supports 20 MHz channel bandwidth operation.

Alternatively, when the STA_X 244 determines that the received probe response frame comprises an HT capabilities IE, the contents of the HT capabilities IE may be inspected by the STA_X 244. The HT capabilities IE within the received probe response frame may comprise information, for example a 40 MHz_Intolerant indication in which 40 MHz_Intolerant=YES. Upon reception of this frame, the STA_X 244 may reconfigure for 20 MHz channel bandwidth operation. The STA_X 244 may perform a disassociation/reassociation sequence as described above.

Figure 3A:
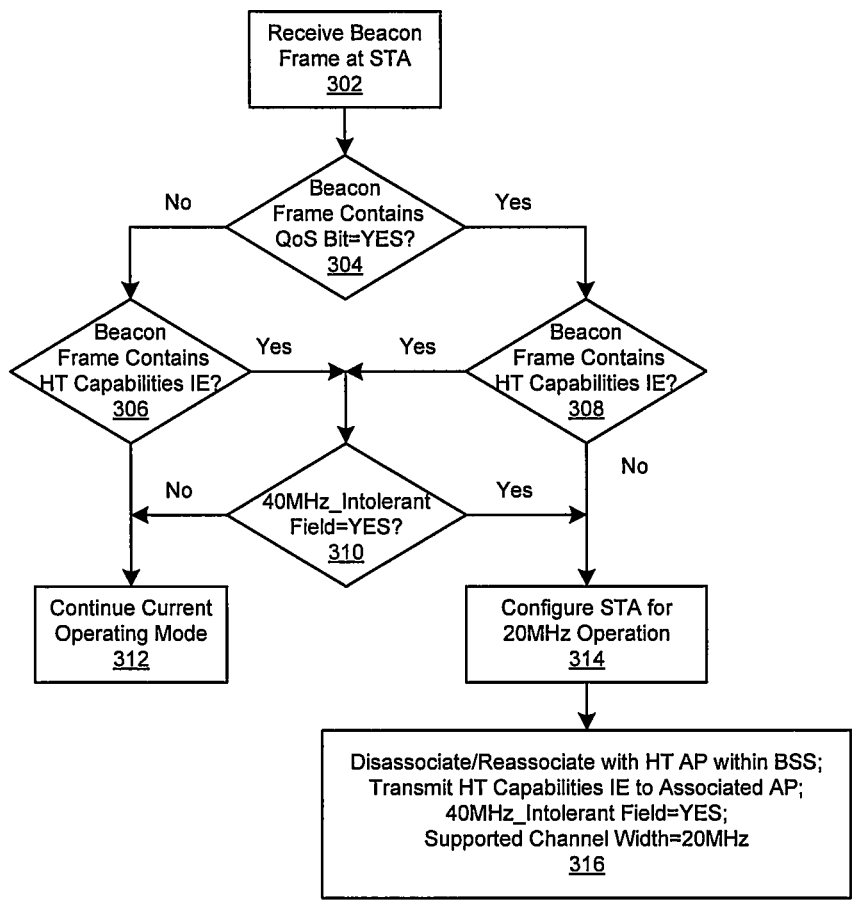
FIG. 3A is a flowchart illustrating exemplary steps for reconfiguration of a WLAN station (STA) for 20 MHz and 40 MHz coexistence within an OBSS, in accordance with an embodiment of the invention.

FIG. 3A is a flowchart illustrating exemplary steps for reconfiguration of a WLAN station (STA) for 20 MHz and 40 MHz coexistence within an OBSS, in accordance with an embodiment of the invention. Referring to FIG. 3A, in step 302, a STA may receive a frame from a transmitting STA. The receiving STA may also receive the frame from a transmitting AP. The receiving STA may scan across several channels and may receive frames from a transmitting STA or AP on any of the scanned channels. The received frame may comprise a management frame such as a beacon frame, for example. In step 304, the receiving STA may determine whether the received frame comprises a QoS indication, which indicates that the frame was transmitted by a STA that may be operating in a BSS within an RF channel specified for prioritized delivery based on a service class definition. This situation may be indicated by a setting a QoS bit value within the frame, for example, QoS_Bit=YES. When, in step 304, the receiving STA determines that the QoS_Bit value is not set to a value, which indicates that the STA may be operating in a BSS within an RF channel specified for prioritized delivery based on a service class definition, in step 306, the receiving STA may determine whether the received frame comprises an IE, which indicates that the transmitting STA is able to indicate HT capabilities, for example via an HT capabilities IE. When, in step 306, the receiving STA determines that the received frame does not comprise an HT capabilities IE, in step 312, the receiving STA may continue in its current operating mode.

When, in step 306, the receiving STA determines that the received frame comprises an HT capabilities IE, in step 310, the receiving STA may attempt to determine whether the received frame comprises an indication, which requests that the receiving STA be reconfigured for 20 MHz channel bandwidth operation, for example, via a 40 MHz_Intolerant=YES indication within the HT capabilities IE. When, in step 310, the receiving STA determines that the HT capabilities IE does not comprise a 40 MHz_Intolerant=YES indication, step 312 may follow.

When, in step 310, the receiving STA determines that the HT capabilities IE comprises a 40 MHz_Intolerant=YES indication, in step 314, the receiving STA may reconfigure for 20 MHz channel bandwidth operation. In step 316, the receiving STA may transmit a disassociation frame to the HT AP within the BSS in which the receiving STA may be associated. The receiving STA may then send a reassociation request frame to the associated HT AP. The reassociation request frame may comprise an HT capabilities IE. The HT capabilities IE may comprise a 40 MHz_Intolerant=YES indication and a Supported_Channel_Width=20 MHz indication. The 40 MHz_Intolerant=YES indication may indicate that the receiving STA requests that the associated HT AP reconfigure for 20 MHz channel bandwidth operation. The Supported_Channel_Width=20 MHz indication may enable the associated HT AP to determine that the receiving STA is configured to support 20 MHz channel bandwidth operation.

When, in step 304, the receiving STA determines that the QoS_Bit value may be set to a value, which indicates that the STA may be operating in a BSS within an RF channel specified for prioritized delivery based on a service class definition, step 308 may follow. Step 308 may be substantially similar to step 306 with the exception that when, in step 308, the receiving STA determines that the received frame does not comprise an HT capabilities IE, step 314 may follow.

Figure 3B:
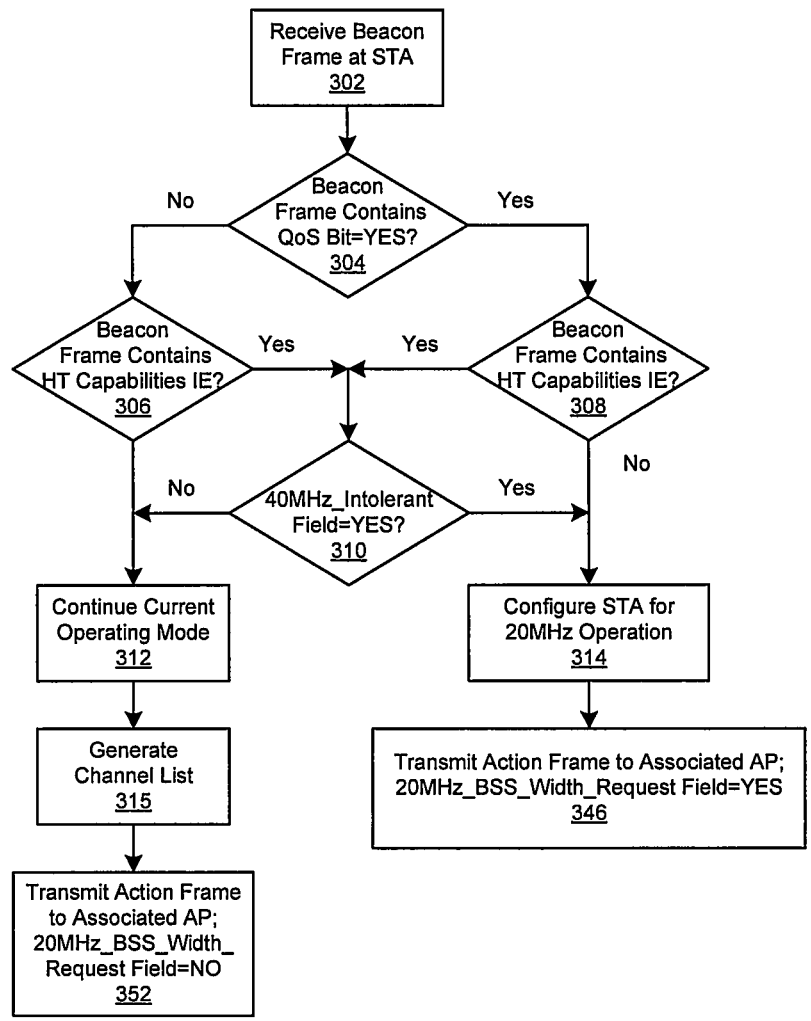
FIG. 3B is a flowchart illustrating exemplary steps for reconfiguration of a WLAN station (STA) with action frame transmission for 20 MHz and 40 MHz coexistence within an OBSS, in accordance with an embodiment of the invention.

FIG. 3B is a flowchart illustrating exemplary steps for reconfiguration of a WLAN station (STA) with action frame transmission for 20 MHz and 40 MHz coexistence within an OBSS, in accordance with an embodiment of the invention. Referring to FIG. 3B, steps 302-314 are as described in FIG. 3A. In step 346 (which follows step 314), the receiving STA may transmit an action frame to the HT AP within which the receiving STA may be associated. The action frame may comprise a 20 MHz_BSS_Width_Request=20 MHz indication. The 20 MHz_BSS_Width_Request=20 MHz may indicate that the receiving STA requests that the associated HT AP reconfigure for 20 MHz channel bandwidth operation.

In step 315 (which follows step 312), the receiving STA may generate a channel list. In various embodiments of the invention, when the receiving STA determines that the received frame comprises a current channel indication field, a receiving STA, may generate a channel list in step 315, which comprises the RF channel number indicated in the current channel indication field or the frame received in step 302.

When, in step 315, the receiving STA determines that the received frame does not comprise a current channel indication field, a receiving STA may generate a channel list, which comprises the channel number for the RF channel on which the received frame was received.

In step 352, the receiving STA may transmit an action frame to the HT AP with which the receiving STA may be associated. The action frame may comprise a 20 MHz_BSS_Width_Request=40 MHz indication. The 20 MHz_BSS_Width_Request=40 MHz may indicate that the receiving STA does not request that the associated HT AP reconfigure for 20 MHz channel bandwidth operation.

Figure 3C:
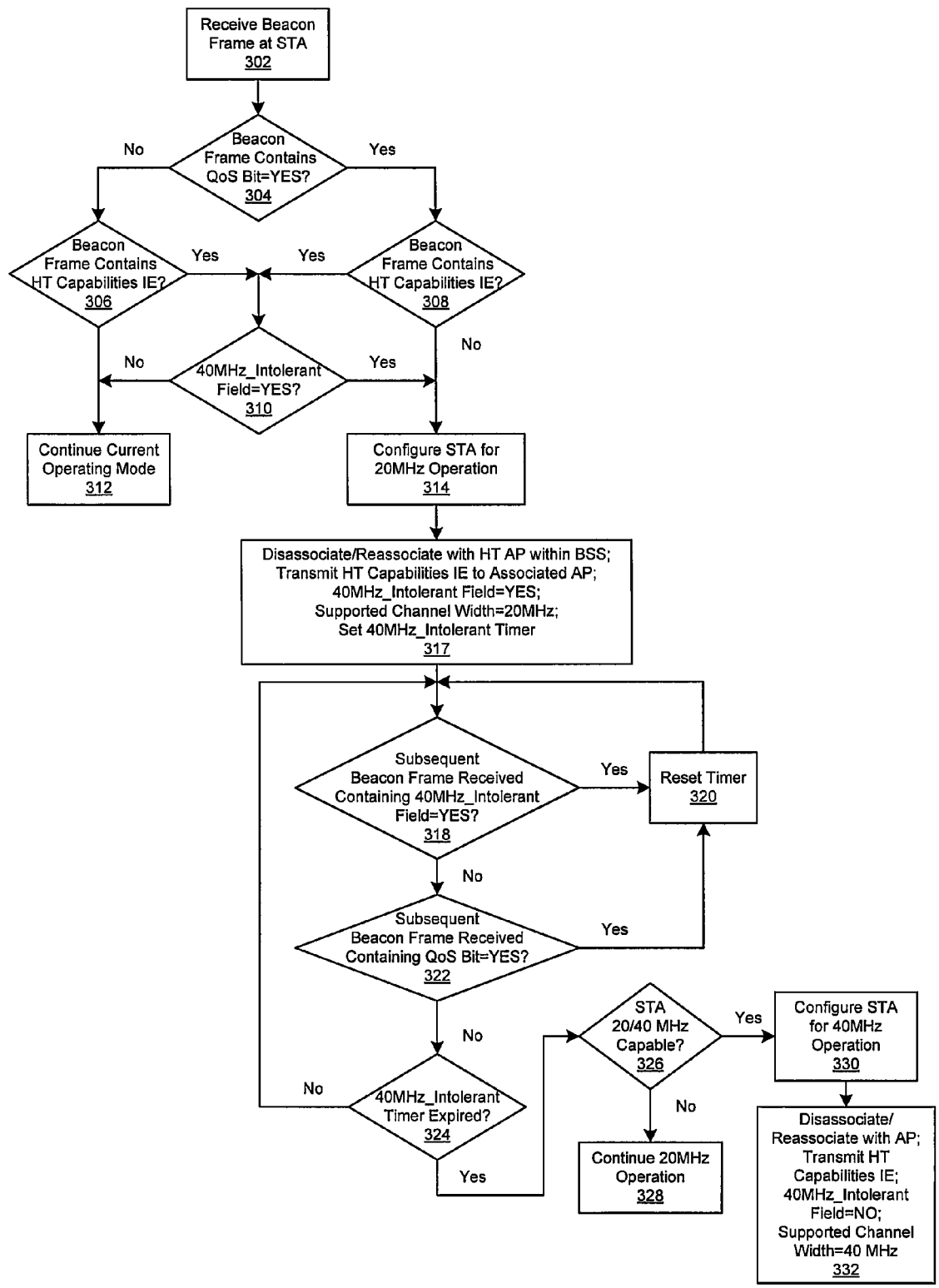
FIG. 3C is a flowchart illustrating exemplary steps for reconfiguration of a WLAN STA for 20 MHz and 40 MHz coexistence within an OBSS with state information stored at the STA, in accordance with an embodiment of the invention.

FIG. 3C is a flowchart illustrating exemplary steps for reconfiguration of a WLAN STA for 20 MHz and 40 MHz coexistence within an OBSS with state information stored at the STA, in accordance with an embodiment of the invention. In FIG. 3C, the receiving STA processes the received frame and may store state information associated with the processing of the received frame. For example, the receiving STA may set a timer to measure the duration of time that has elapsed subsequent to receipt of a frame. Referring to FIG. 3C, step 302-314 are as described in FIG. 3A. Step 317 is substantially similar to step 316 in FIG. 3A with the addition that, in step 317, the receiving STA may set a 40 MHz_Intolerant timer. The 40 MHz_Intolerant time may measure the time duration that has elapsed since the receiving STA received a frame, which caused the receiving STA to configure for 20 MHz channel bandwidth operation. The amount of time measured by the 40 MHz_Intolerant timer may correspond to a determined minimum period of time.

In step 318, the receiving STA may determine whether a subsequent frame has been received within the determined minimum time period, which comprises a 40 MHz_Intolerant=YES indication. When in step 318, the receiving STA determines that a subsequent frame, which comprises a 40 MHz_Intolerant=YES indication has been received, in step 320, the 40 MHz_Intolerant timer may be reset to measure a subsequent minimum time period.

When in step 318, the receiving STA determines that a subsequent frame, which comprises a 40 MHz_Intolerant=YES indication has not been received, in step 322, the receiving STA may determine whether a subsequent frame has been received within the determined minimum time period, which comprises a QoS_Bit=YES indication. When in step 322, the receiving STA determines that the received frame comprises a QoS_Bit=YES indication, step 320 may follow.

When in step 322, the receiving STA determines that the received frame does not comprise a QoS_Bit=YES indication, in step 324, the receiving STA may determine whether the 40 MHz_Intolerant timer has expired. The 40 MHz_Intolerant timer may be expired when the determined minimum time period has elapsed without receipt of a subsequent frame, which would cause the receiving STA to configure for 20 MHz channel bandwidth operation. When in step 324, the receiving STA determines that the 40 MHz_Intolerant timer has not expired, step 318 may follow.

When in step 324, the receiving STA determines that the 40 MHz_Intolerant timer has expired, in step 326, the receiving STA may determine whether it is an HT capable STA, which may selectively utilize 20 MHz channel bandwidth operation or 40 MHz channel bandwidth operation. When in step 326, the receiving STA determines that it is not capable of selectively utilizing 20 MHz channel bandwidth operation or 40 MHz channel bandwidth operation, in step 328, the receiving STA may continue 20 MHz channel bandwidth operation.

When in step 326, the receiving STA determines that it is capable of selectively utilizing 20 MHz channel bandwidth operation or 40 MHz channel bandwidth operation, in step 330, the receiving STA may configure for 40 MHz channel bandwidth operation. In step 332, the receiving STA may transmit a disassociation frame to the HT AP within the BSS in which the receiving STA is associated. The receiving STA may then send a reassociation request frame to the associated HT AP. The reassociation request frame may comprise an HT capabilities IE. The HT capabilities IE may comprise a 40 MHz_Intolerant=NO indication and a Supported_Channel_Width=40 MHz indication. The 40 MHz_Intolerant=NO indication may indicate that the receiving STA does not request that the associated HT AP reconfigure for 20 MHz channel bandwidth operation. The Supported_Channel_Width=40 MHz indication may enable the associated HT AP to determine that the receiving STA may be configured to support 40 MHz channel bandwidth operation.

Figure 3D:
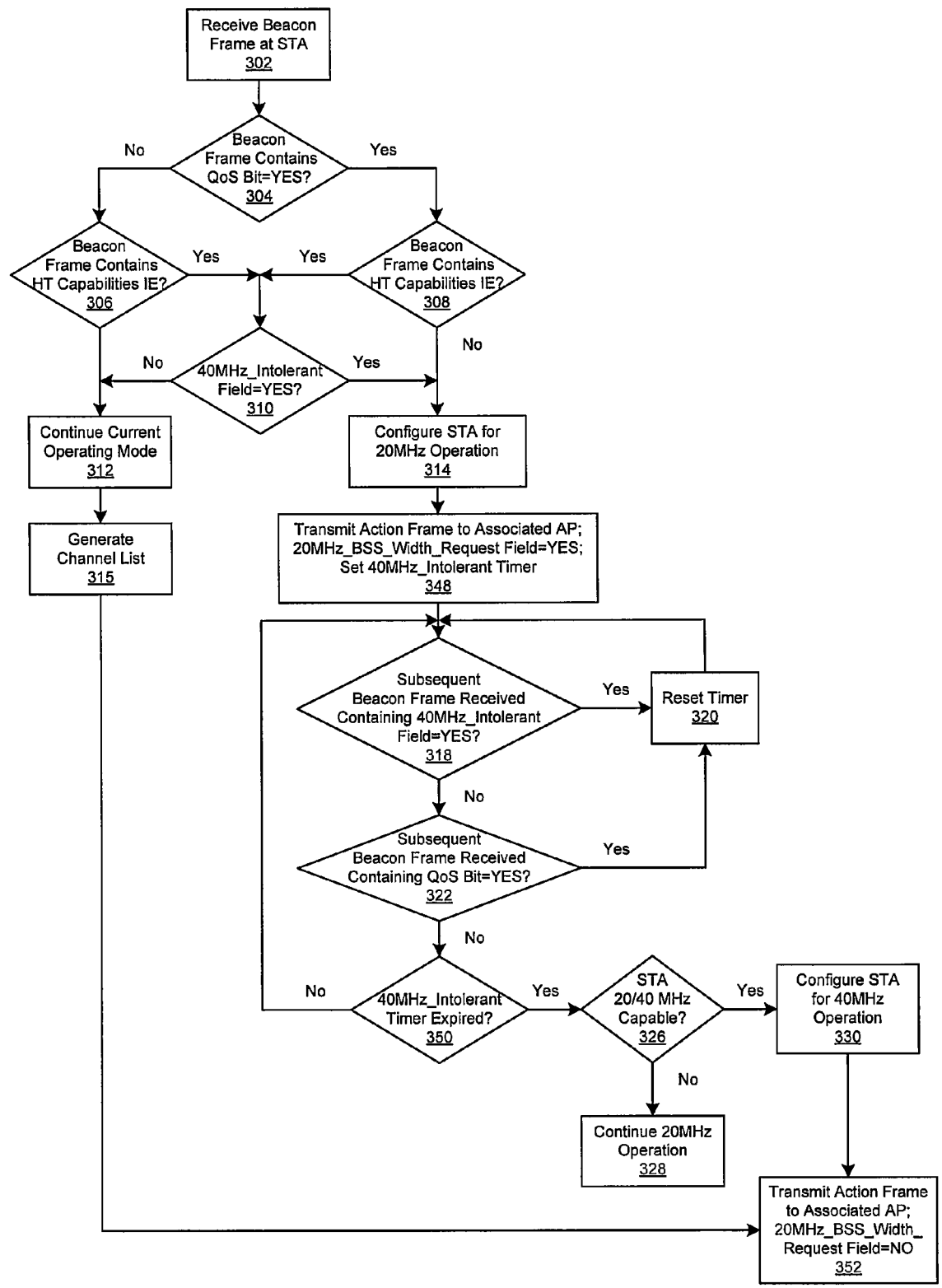
FIG. 3D is a flowchart illustrating exemplary steps for reconfiguration of a WLAN STA with action frame transmission for 20 MHz and 40 MHz coexistence within an OBSS with state information stored at the STA, in accordance with an embodiment of the invention.

FIG. 3D is a flowchart illustrating exemplary steps for reconfiguration of a WLAN STA with action frame transmission for 20 MHz and 40 MHz coexistence within an OBSS with state information stored at the STA, in accordance with an embodiment of the invention. Referring to FIG. 3D, steps 302-315 are as described in FIG. 3B. The receiving STA may transmit an action frame as shown in step 352 (as described in FIG. 3B and below) following step 315.

In step 348 (which follows step 314), the receiving STA may transmit an action frame to the HT AP within which the receiving STA may be associated. The action frame may comprise a 20 MHz_BSS_Width_Request=20 MHz indication. The 20 MHz_BSS_Width_Request=20 MHz may indicate that the receiving STA requests that the associated HT AP reconfigure for 20 MHz channel bandwidth operation. The receiving STA may also set a 40 MHz_Intolerant restriction timer. The 40 MHz_Intolerant timer is described above.

In step 318, the receiving STA may determine whether a subsequent frame has been received within the determined minimum time period, which comprises a 40 MHz_Intolerant=YES indication. When in step 318, the receiving STA determines that a subsequent frame, which comprises a 40 MHz_Intolerant=YES indication has been received, in step 320, the 40 MHz_Intolerant timer may be reset to measure a subsequent minimum time period.

When in step 318, the receiving STA determines that a subsequent frame, which comprises a 40 MHz_Intolerant=YES indication has not been received, in step 322, the receiving STA may determine whether a subsequent frame has been received within the determined minimum time period, which comprises a QoS_Bit=YES indication. When in step 322, the receiving STA determines that the received frame comprises a QoS_Bit=YES indication, step 320 may follow.

When in step 322, the receiving STA determines that the received frame does not comprise a QoS_Bit=YES indication, in step 350, the receiving STA may determine whether the 40 MHz_Intolerant timer has expired. When in step 350, the receiving STA determines that the 40 MHz_Intolerant timer has not expired, step 318 may follow.

When in step 350, the receiving STA determines that the 40 MHz_Intolerant timer has expired, in step 326, the receiving STA may determine whether it is an HT capable STA, which may selectively utilize 20 MHz channel bandwidth operation or 40 MHz channel bandwidth operation. When in step 326, the receiving STA determines that it is not capable of selectively utilizing 20 MHz channel bandwidth operation or 40 MHz channel bandwidth operation, in step 328, the receiving STA may continue 20 MHz channel bandwidth operation.

When in step 326, the receiving STA determines that it is capable of selectively utilizing 20 MHz channel bandwidth operation or 40 MHz channel bandwidth operation, in step 330, the receiving STA may configure for 40 MHz channel bandwidth operation. In step 352, the receiving STA may transmit an action frame to the HT AP with which the receiving STA may be associated. The action frame may comprise a 20 MHz_BSS_Width_Request=40 MHz indication. The 20 MHz_BSS_Width_Request=40 MHz may indicate that the receiving STA does not request that the associated HT AP reconfigure for 20 MHz channel bandwidth operation.

Figure 4:
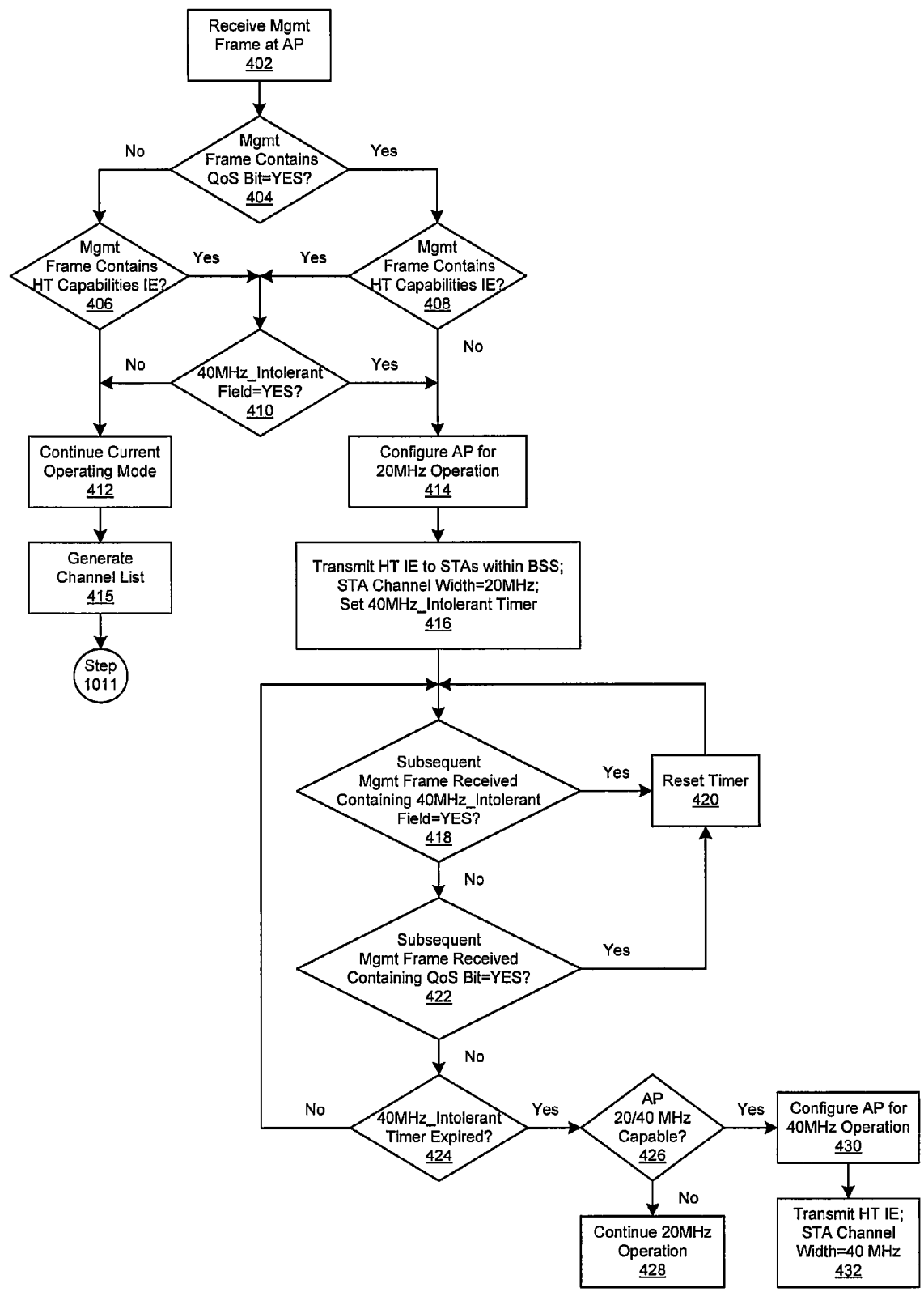
FIG. 4 is a flowchart illustrating exemplary steps for reconfiguration of a WLAN access point (AP) for 20 MHz and 40 MHz coexistence within an OBSS, in accordance with an embodiment of the invention.

FIG. 4 is a flowchart illustrating exemplary steps for reconfiguration of a WLAN access point (AP) for 20 MHz and 40 MHz coexistence within an OBSS, in accordance with an embodiment of the invention. Referring to FIG. 4, in step 402, an AP may receive a frame from a transmitting STA. The receiving AP may also receive the frame from a transmitting AP. The received frame may comprise a management (mgmt) frame such as a beacon frame or a reassociation request frame, for example. In step 404, the receiving AP may determine whether the received frame comprises a QoS indication, which indicates that the STA may be operating in a BSS within an RF channel specified for prioritized delivery based on a service class definition. This event may be indicated by a setting a QoS bit value within the frame, for example, QoS_Bit=YES. When, in step 404, the receiving AP determines that the QoS_Bit value is not set to a value, which indicates that the STA may be operating in a BSS within an RF channel specified for prioritized delivery based on a service class definition, in step 406, the receiving AP may determine whether the received frame comprises an IE, which indicates that the transmitting STA is able to indicate HT capabilities, for example via an HT capabilities IE. When, in step 406, the receiving AP determines that the received frame does not comprise an HT capabilities IE, in step 412, the receiving AP may continue in its current operating mode.

In step 415 (which follows step 412), the receiving AP may generate a channel list. In various embodiments of the invention, when the receiving AP determines that the received frame comprises a current channel indication field, a receiving AP, may generate a channel list in step 415, which comprises the RF channel number indicated in the current channel indication field or the frame received in step 402.

When, in step 415, the receiving STA determines that the received frame does not comprise a current channel indication field, a receiving AP may generate a channel list, which comprises the channel number for the RF channel on which the received frame was received.

Step 1011 (FIG. 10) may follow step 415. The receiving AP may inspect the generated channel list to determine whether the local BSS utilizes any of the channels listed in the channel list. The receiving AP may reconfigure for 20 MHz channel bandwidth operation based on this determination. This process is described in further detail in FIG. 10.

When, in step 406, the receiving AP determines that the received frame comprises an HT capabilities IE, in step 410, the receiving AP may attempt to determine whether the received frame comprises an indication, which requests that the receiving AP be reconfigured for 20 MHz channel bandwidth operation, for example, via a 40 MHz_Intolerant=YES indication within the HT capabilities IE. When, in step 410, the receiving AP determines that the HT capabilities IE does not comprise a 40 MHz_Intolerant=YES indication, step 412 may follow.

When, in step 410, the receiving AP determines that the HT capabilities IE comprise a 40 MHz_Intolerant=YES indication, in step 414, the receiving AP may reconfigure for 20 MHz channel bandwidth operation. In step 416, the receiving AP may transmit a management frame, such as a beacon frame, to the STAs within the BSS in which the receiving AP is associated. The management frame may comprise an HT capabilities IE. The HT capabilities IE may comprise a STA_Channel_Width=20 MHz indication. The STA_Channel_Width=20 MHz indication may enable the associated HT STAs to determine that they are to reconfigure to support 20 MHz channel bandwidth operation. The receiving AP may set a 40 MHz_Intolerant timer. The 40 MHz_Intolerant time may measure the time duration that has elapsed since the receiving AP received a frame, which caused the receiving AP to configure for 20 MHz channel bandwidth operation. The amount of time measured by the 40 MHz_Intolerant timer may correspond to a determined minimum period of time.

When, in step 404, the receiving AP determines that the QoS_Bit value is set to a value, which indicates that the STA may be operating in a BSS within an RF channel specified for prioritized delivery based on a service class definition, step 408 may follow. Step 408 may be substantially similar to step 406 with the exception that when, in step 408, the receiving AP determines that the received frame does not comprise an HT capabilities IE, step 414 may follow.

In step 418, the receiving AP may determine whether a subsequent frame has been received within the determined minimum time period, which comprise a 40 MHz_Intolerant=YES indication. When in step 418, the receiving AP determines that a subsequent frame, which comprises a 40 MHz_Intolerant=YES indication has been received, in step 420, the 40 MHz_Intolerant timer may be reset to measure a subsequent minimum time period.

When in step 418, the receiving AP determines that a subsequent frame, which comprises a 40 MHz_Intolerant=YES indication has not been received, in step 422, the receiving AP may determine whether a subsequent frame has been received within the determined minimum time period, which comprises a QoS_Bit=YES indication. When in step 422, the receiving AP determines that the received frame comprises a QoS_Bit=YES indication, step 420 may follow.

When in step 422, the receiving AP determines that the received frame does not comprise a QoS_Bit=YES indication, in step 424, the receiving AP may determine whether the 40 MHz_Intolerant timer has expired. The 40 MHz_Intolerant timer may be expired when the determined minimum time period has elapsed without receipt of a subsequent frame, which would cause the receiving AP to configure for 20 MHz channel bandwidth operation. When in step 424, the receiving STA determines that the 40 MHz_Intolerant timer has not expired, step 418 may follow.

When in step 424, the receiving STA determines that the 40 MHz_Intolerant timer has expired, in step 426, the receiving AP may determine whether it is an HT capable AP, which may selectively utilize 20 MHz channel bandwidth operation or 40 MHz channel bandwidth operation. When in step 426, the receiving AP determines that it is not capable of selectively utilizing 20 MHz channel bandwidth operation or 40 MHz channel bandwidth operation, in step 428, the receiving AP may continue 20 MHz channel bandwidth operation.

When in step 426, the receiving AP determines that it is capable of selectively utilizing 20 MHz channel bandwidth operation or 40 MHz channel bandwidth operation, in step 430, the receiving STA may configure for 40 MHz channel bandwidth operation. In step 432, the receiving AP may transmit a management frame, such as a beacon frame, to the STAs within the BSS in which the receiving AP is associated. The management frame may comprise an HT capabilities IE. The HT capabilities IE may comprise a STA_Channel_Width=40 MHz indication. The STA_Channel_Width=40 MHz indication may enable the associated HT STAs to determine that they may be reconfigured to support 40 MHz channel bandwidth operation.

In various embodiments of the invention, when the receiving AP determines that the received frame comprises a current channel indication field, a receiving AP, which reconfigures for 20 MHz channel bandwidth operation, may apply the reconfiguration when utilizing the RF channel indicated in the current channel indication field, while utilizing 20 MHz or 40 MHz channel bandwidth operation when utilizing other RF channels.

When the receiving AP determines that the received frame does not comprise a current channel indication field, a receiving AP, which reconfigures for 20 MHz channel bandwidth operation may apply the reconfiguration when utilizing the RF channel on which the received frame was received, while utilizing 20 MHz or 40 MHz channel bandwidth operation when utilizing other RF channels.

Figure 5A:
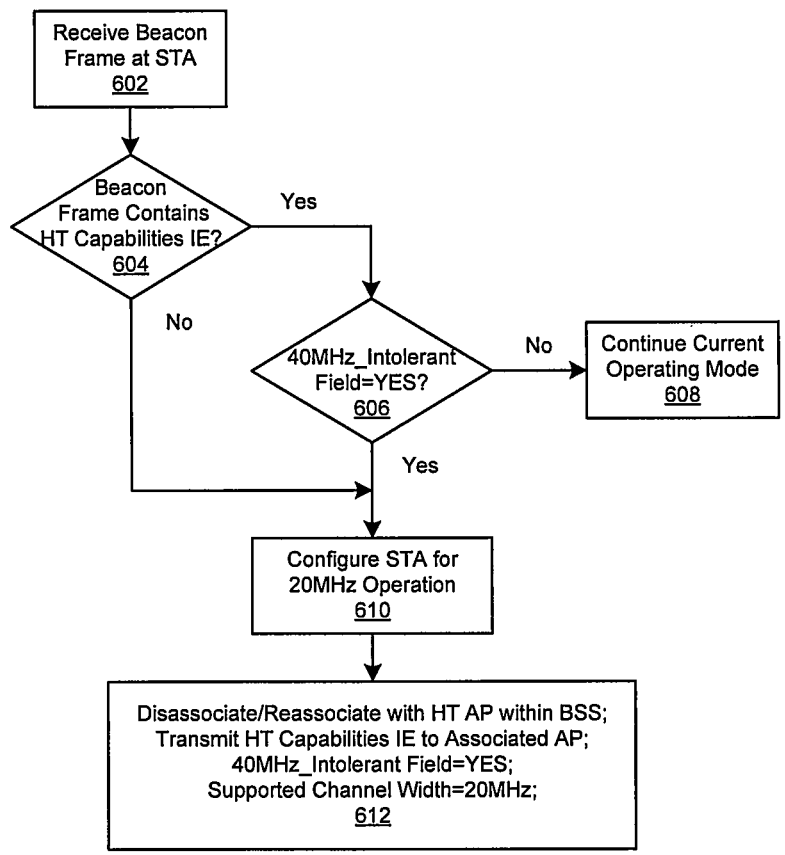
FIG. 5A is a flowchart illustrating exemplary steps for less restrictive reconfiguration of a WLAN STA for 20 MHz and 40 MHz coexistence within an OBSS, in accordance with an embodiment of the invention.

FIG. 5A is a flowchart illustrating exemplary steps for less restrictive reconfiguration of a WLAN STA for 20 MHz and 40 MHz coexistence within an OBSS, in accordance with an embodiment of the invention. FIG. 5A differs from FIG. 3A in that in FIG. 5A the receiving STA may not evaluate QoS-related information when processing received frames. Referring to FIG. 5A, in step 602, a STA may receive a management frame from a transmitting STA or AP. In step 604, the receiving STA may determine whether the received frame comprises an IE, which indicates that the transmitting STA is able to indicate HT capabilities, for example via an HT capabilities IE.

When, in step 604, the receiving STA determines that the received frame comprises an HT capabilities IE, in step 606, the receiving STA may attempt to determine whether the received frame comprises an indication, which requests that the receiving STA reconfigure for 20 MHz channel bandwidth operation, for example, via a 40 MHz_Intolerant=YES indication within the HT capabilities IE. When, in step 606, the receiving STA determines that the HT capabilities IE does not comprise a 40 MHz_Intolerant=YES indication, in step 608 the receiving STA may continue in its current operating mode.

When, in step 606, the receiving STA determines that the HT capabilities IE does comprise a 40 MHz_Intolerant=YES indication, in step 610, the receiving STA may be reconfigured for 20 MHz channel bandwidth operation. In step 612, the receiving STA may transmit a disassociation frame to the HT AP within the BSS in which the receiving STA is associated. The receiving STA may then send a reassociation request frame to the associated HT AP. The reassociation request frame may comprise an HT capabilities IE. The HT capabilities IE may comprise a 40 MHz_Intolerant=YES indication and a Supported_Channel_Width=20 MHz indication. The 40 MHz_Intolerant=YES indication may indicate that the receiving STA requests that the associated HT AP be reconfigured for 20 MHz channel bandwidth operation. The Supported_Channel_Width=20 MHz indication may enable the associated HT AP to determine that the receiving STA is configured to support 20 MHz channel bandwidth operation.

When, in step 604, the receiving STA determines that the received management frame does not comprise an HT capabilities IE, step 610 may follow and the receiving STA may configure for 20 MHz operation.

Figure 5B:
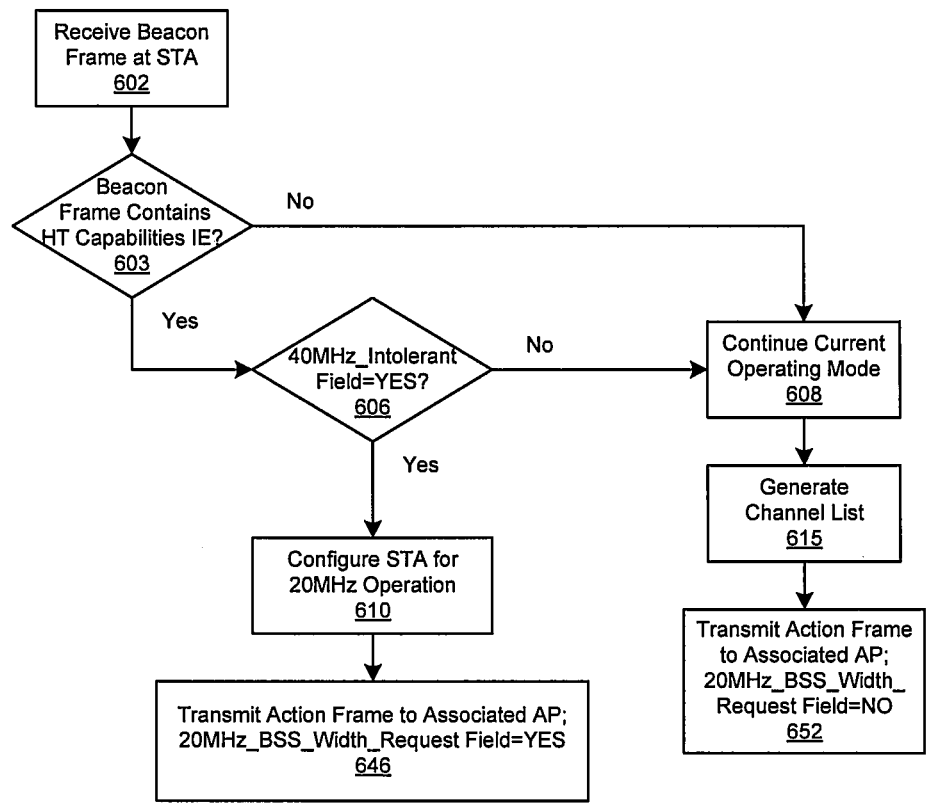
FIG. 5B is a flowchart illustrating exemplary steps for less restrictive reconfiguration of a WLAN STA with action frame transmission for 20 MHz and 40 MHz coexistence within an OBSS, in accordance with an embodiment of the invention.

FIG. 5B is a flowchart illustrating exemplary steps for less restrictive reconfiguration of a WLAN STA with action frame transmission for 20 MHz and 40 MHz coexistence within an OBSS, in accordance with an embodiment of the invention. Referring to FIG. 5B, in step 602, a STA may receive a management frame from a transmitting STA or AP. In step 603, the receiving STA may determine whether the received frame comprises an IE, which indicates that the transmitting STA is able to indicate HT capabilities, for example via an HT capabilities IE.

When, in step 603, the receiving STA determines that the received frame comprises an HT capabilities IE, in step 606, the receiving STA may attempt to determine whether the received frame comprises an indication, which requests that the receiving STA reconfigure for 20 MHz channel bandwidth operation, for example, via a 40 MHz_Intolerant=YES indication within the HT capabilities IE. When, in step 606, the receiving STA determines that the HT capabilities IE does not comprise a 40 MHz_Intolerant=YES indication, in step 608, the receiving STA may continue in its current operating mode. Step 615, which follows step 608, is substantially similar to step 315 (FIG. 3B). Step 652 is substantially similar to step 352 (FIG. 3B). Step 646, which follows step 610, is substantially similar to step 346 (FIG. 3B).

When, in step 603, the receiving STA determines that the received frame does not comprise an HT capabilities IE, step 608 may follow step 603.

Figure 6A:
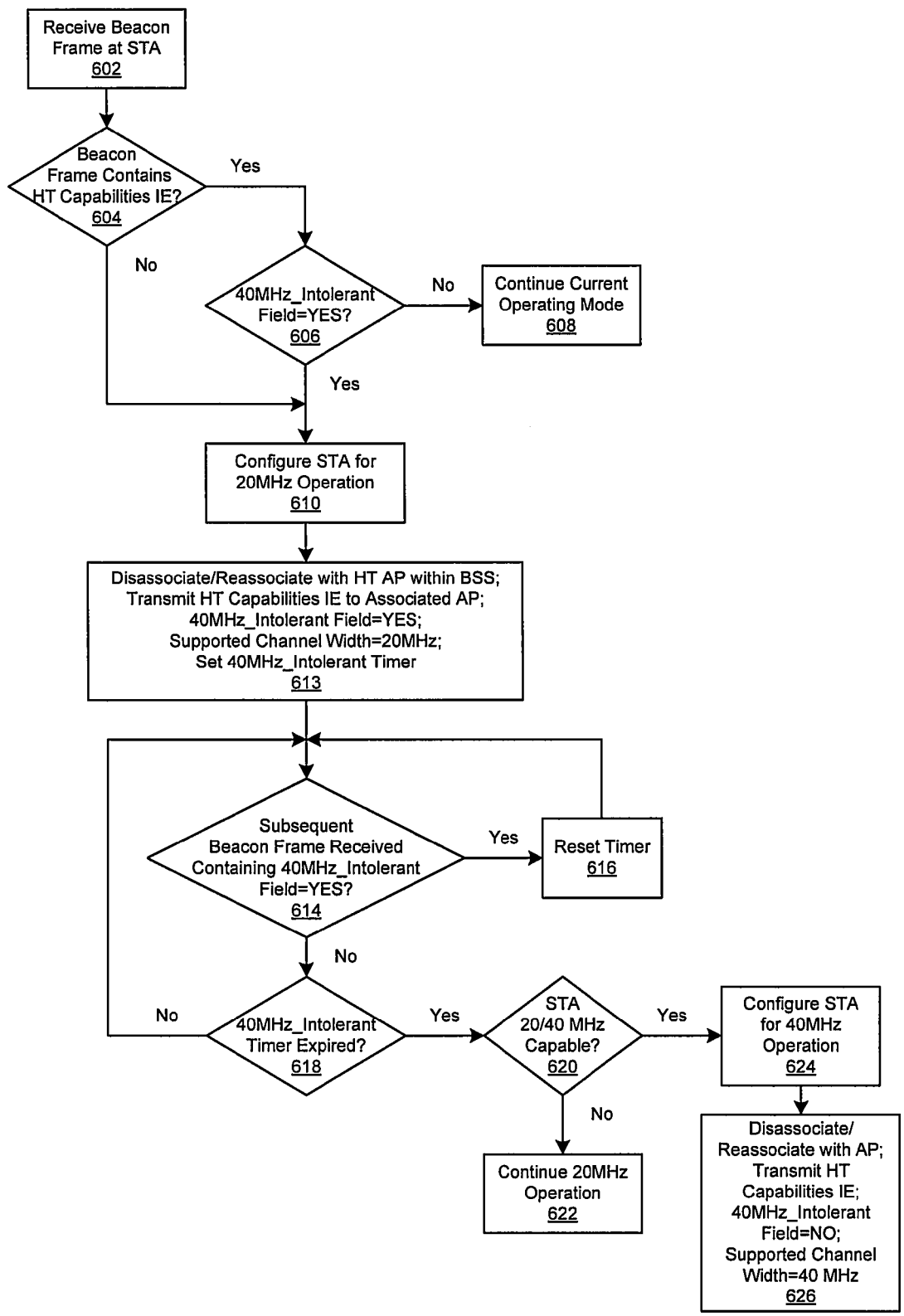
FIG. 6A is a flowchart illustrating exemplary steps for less restrictive reconfiguration of a WLAN STA for 20 MHz and 40 MHz coexistence within an OBSS with state information stored at the STA, in accordance with an embodiment of the invention.

FIG. 6A is a flowchart illustrating exemplary steps for less restrictive reconfiguration of a WLAN STA for 20 MHz and 40 MHz coexistence within an OBSS with state information stored at the STA, in accordance with an embodiment of the invention. In FIG. 6A, the receiving STA processes the received frame and may store state information associated with the processing of the received frame. Referring to FIG. 6A, step 602-610 are as described in FIG. 5A. Step 613 may be substantially similar to step 612 in FIG. 5A with the addition that, in step 613, the receiving STA may set a 40 MHz_Intolerant timer.

In step 614, the receiving STA may determine whether a subsequent frame has been received within the determined minimum time period, which comprises a 40 MHz_Intolerant=YES indication. When in step 614, the receiving STA determines that a subsequent frame, which comprises a 40 MHz_Intolerant=YES indication has been received, in step 616, the 40 MHz_Intolerant timer may be reset to measure a subsequent minimum time period. Step 616 may also follow step 614, when the receiving STA determines that the subsequent frame does not comprise an HT capabilities IE.

When in step 614, the receiving STA determines that a subsequent frame, which comprises a 40 MHz_Intolerant=YES indication (or a subsequent frame, which does not comprise an HT capabilities IE) has not been received, in step 618, the receiving STA may determine whether the 40 MHz_Intolerant timer has expired. When in step 618, the receiving STA determines that the 40 MHz_Intolerant timer has not expired, step 614 may follow.

When in step 618, the receiving STA determines that the 40 MHz_Intolerant timer has expired, in step 620, the receiving STA may determine whether it may be an HT capable STA, which may selectively utilize 20 MHz channel bandwidth operation or 40 MHz channel bandwidth operation. When in step 620, the receiving STA determines that it may not be capable of selectively utilizing 20 MHz channel bandwidth operation or 40 MHz channel bandwidth operation, in step 622, the receiving STA may continue 20 MHz channel bandwidth operation.

When in step 620, the receiving STA determines that it may be capable of selectively utilizing 20 MHz channel bandwidth operation or 40 MHz channel bandwidth operation, in step 624, the receiving STA may be configured for 40 MHz channel bandwidth operation. In step 626, the receiving STA may transmit a disassociation frame to the HT AP within the BSS in which the receiving STA may be associated. The receiving STA may then send a reassociation request frame to the associated HT AP. The reassociation request frame may comprise an HT capabilities IE. The HT capabilities IE may comprise a 40 MHz_Intolerant=NO indication and a Supported_Channel_Width=40 MHz indication.

Figure 6B:
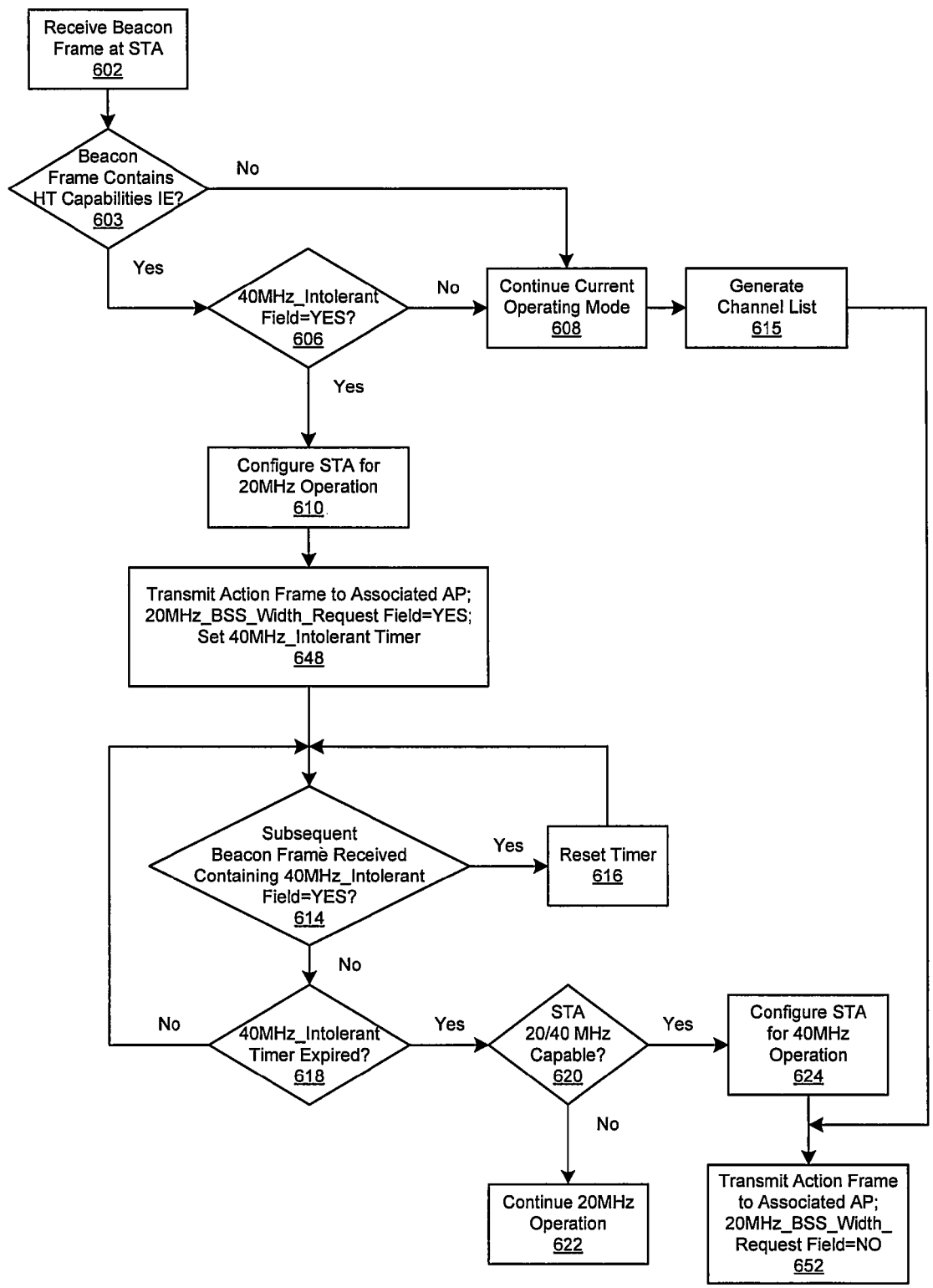
FIG. 6B is a flowchart illustrating exemplary steps for less restrictive reconfiguration of a WLAN STA with action frame transmission for 20 MHz and 40 MHz coexistence within an OBSS with state information stored at the STA, in accordance with an embodiment of the invention.

FIG. 6B is a flowchart illustrating exemplary steps for less restrictive reconfiguration of a WLAN STA with action frame transmission for 20 MHz and 40 MHz coexistence within an OBSS with state information stored at the STA, in accordance with an embodiment of the invention. Referring to FIG. 6B, steps 602-615 are as described in FIG. 5B. Step 648, which follows step 610, is substantially similar to step 348 (FIG. 3B). Step 614 follows step 648. Steps 614-624 are as shown in FIG. 6A. Step 652, which follows step 624 or step 615, is substantially similar to step 352 (FIG. 3B).

Figure 7:
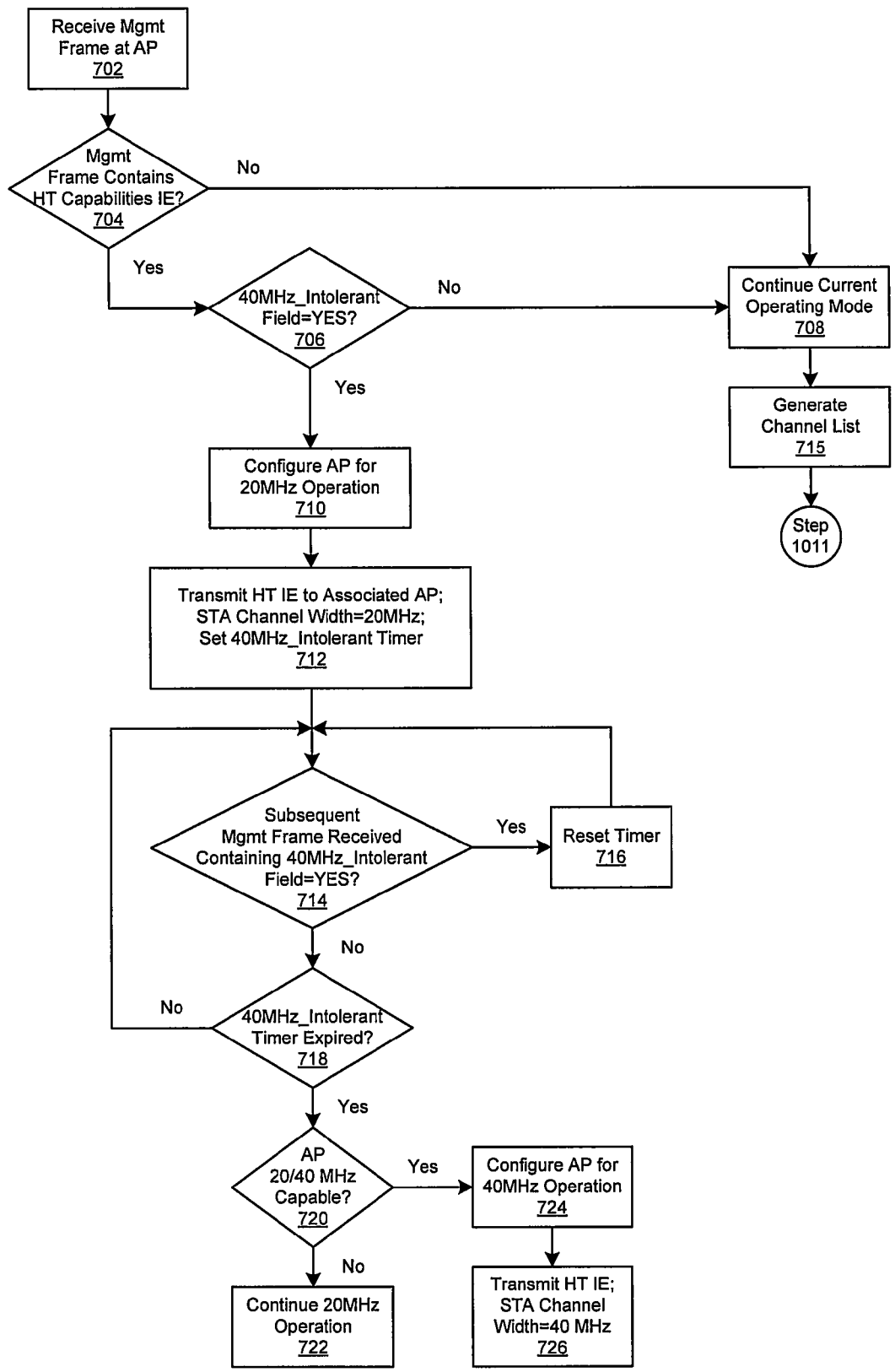
FIG. 7 is a flowchart illustrating exemplary steps for less restrictive reconfiguration of a WLAN AP for 20 MHz and 40 MHz coexistence within an OBSS, in accordance with an embodiment of the invention.

FIG. 7 is a flowchart illustrating exemplary steps for less restrictive reconfiguration of a WLAN AP for 20 MHz and 40 MHz coexistence within an OBSS, in accordance with an embodiment of the invention. FIG. 7 differs from FIG. 4 in that in FIG. 7 the receiving AP may not evaluate QoS-related information when processing received frames. Referring to FIG. 7, in step 702, an AP may receive a management frame from a transmitting STA or AP. In step 704, the receiving AP may determine whether the received frame comprises an IE, which indicates that the transmitting STA may be able to indicate HT capabilities, for example via an HT capabilities IE.

When, in step 704, the receiving AP determines that the received frame comprises an HT capabilities IE, in step 706, the receiving STA may attempt to determine whether the received frame comprises an indication, which requests that the receiving AP reconfigure for 20 MHz channel bandwidth operation, for example, via a 40 MHz_Intolerant=YES indication within the HT capabilities IE. When, in step 706, the receiving AP determines that the HT capabilities IE does not comprise a 40 MHz_Intolerant=YES indication, in step 708 the receiving AP may continue in its current operating mode. Step 715, which follows step 708, is substantially similar to step 415 (FIG. 4). Step 1011 (FIG. 10) may follow step 715.

When, in step 706, the receiving AP determines that the HT capabilities IE does comprise a 40 MHz_Intolerant=YES indication, in step 710, the receiving AP may be reconfigured for 20 MHz channel bandwidth operation. In step 712, the receiving AP may transmit a management frame, for example a beacon frame, to the STAs within the BSS in which the receiving AP is associated. The transmitted management frame may comprise an HT capabilities IE. The HT capabilities IE may comprise a STA_Channel_Width=20 MHz indication. The STA_Channel_Width=20 MHz indication may enable the associated HT STAs to determine that they are to configure to support 20 MHz channel bandwidth operation. The receiving AP may set a 40 MHz_Intolerant timer.

In step 714, the receiving AP may determine whether a subsequent frame has been received within the determined minimum time period, which comprises a 40 MHz_Intolerant=YES indication. When in step 714, the receiving AP determines that a subsequent frame, which may comprise a 40 MHz_Intolerant=YES indication has been received, in step 716, the 40 MHz_Intolerant timer may be reset to measure a subsequent minimum time period. Step 716 may also follow step 714, when the receiving AP determines that the subsequent frame does not comprise an HT capabilities IE.

When in step 714, the receiving AP determines that a subsequent frame, which comprises a 40 MHz_Intolerant=YES indication (or a subsequent frame, which may not comprise an HT capabilities IE) has not been received, in step 718, the receiving AP may determine whether the 40 MHz_Intolerant timer has expired. When in step 718, the receiving AP determines that the 40 MHz_Intolerant timer has not expired, step 714 may follow.

When in step 718, the receiving AP determines that the 40 MHz_Intolerant timer has expired, in step 720, the receiving AP may determine whether it may be an HT capable AP, which may selectively utilize 20 MHz channel bandwidth operation or 40 MHz channel bandwidth operation. When in step 720, the receiving AP determines that it is not capable of selectively utilizing 20 MHz channel bandwidth operation or 40 MHz channel bandwidth operation, in step 722, the receiving AP may continue 20 MHz channel bandwidth operation.

When in step 720, the receiving STA determines that it may be capable of selectively utilizing 20 MHz channel bandwidth operation or 40 MHz channel bandwidth operation, in step 724, the receiving STA may be reconfigured for 40 MHz channel bandwidth operation. In step 726, the receiving STA may transmit a management frame, for example a beacon frame, to the STAs within the BSS in which the receiving AP is associated. The transmitted management frame may comprise an HT capabilities IE. The HT capabilities IE may comprise a STA_Channel_Width=40 MHz indication.

When, in step 704, the receiving AP determines that the received frame does not comprise an HT capabilities IE, step 708 may follow step 704.

Figure 8A:
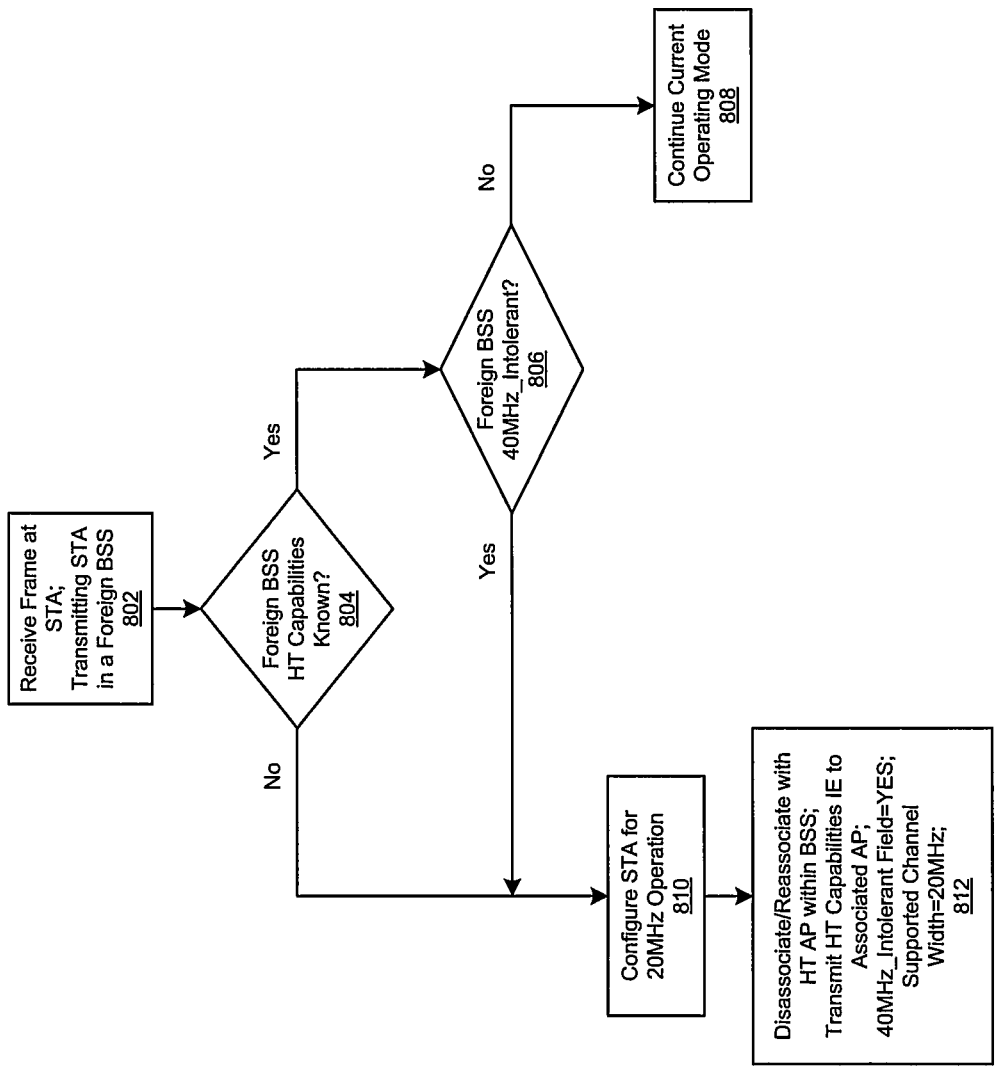
FIG. 8A is a flowchart illustrating exemplary steps for 20 MHz and 40 MHz coexistence with an OBSS, in accordance with an embodiment of the invention.

FIG. 8A is a flowchart illustrating exemplary steps for 20 MHz and 40 MHz coexistence with an OBSS, in accordance with an embodiment of the invention. Referring to FIG. 8A, in step 802, the receiving STA may receive a frame from a transmitting STA that may be associated with a foreign BSS. In step 804, the receiving STA may determine whether the HT capabilities for the foreign BSS are known at the receiving STA. When the HT capabilities for the foreign BSS are known at the receiving STA, in step 806, the receiving STA may determine whether the HT capabilities indicate that the foreign BSS may be operating in a 40 MHz intolerant mode. When, in step 806, the receiving STA determines that the foreign BSS may be operating in a 40 MHz intolerant mode, in step 810, the receiving STA may be reconfigured for 20 MHz channel bandwidth operation. In step 812, the receiving STA may transmit a disassociation frame to the HT AP within the BSS in which the receiving STA may be associated. The receiving STA may then send a reassociation request frame to the associated HT AP. The reassociation request frame may comprise an HT capabilities IE. The HT capabilities IE may comprise a 40 MHz_Intolerant=YES indication and a Supported_Channel_Width=20 MHz indication. When, in step 806, the receiving STA determines that the foreign BSS may not be operating in a 40 MHz intolerant mode, in step 808, the receiving STA may continue operating in its current operating mode. When in step 804, the receiving STA determines that the HT capabilities of the foreign BSS are not known to the receiving STA, step 810 may follow.

Figure 8B:
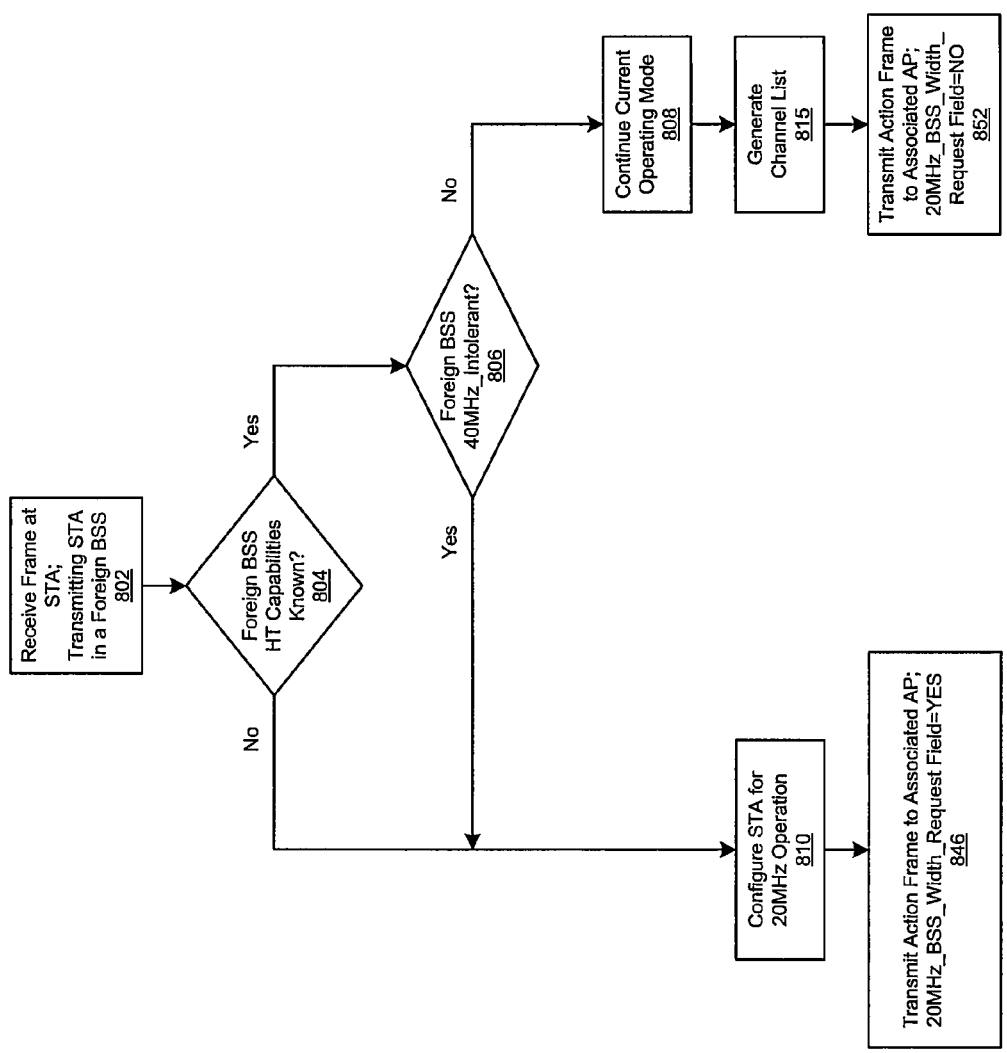
FIG. 8B is a flowchart illustrating exemplary steps for 20 MHz and 40 MHz coexistence with an OBSS with action frame transmission, in accordance with an embodiment of the invention.

FIG. 8B is a flowchart illustrating exemplary steps for 20 MHz and 40 MHz coexistence with an OBSS with action frame transmission, in accordance with an embodiment of the invention. Referring to FIG. 8B, steps 802-808 are as shown in FIG. 8A. Step 815, which follows step 808, is substantially similar to step 315 (FIG. 3B). Step 852, which follows step 815, is substantially similar to step 352 (FIG. 3B). Step 846, which follows step 810, is substantially similar to step 346 (FIG. 3B).

Figure 9A:
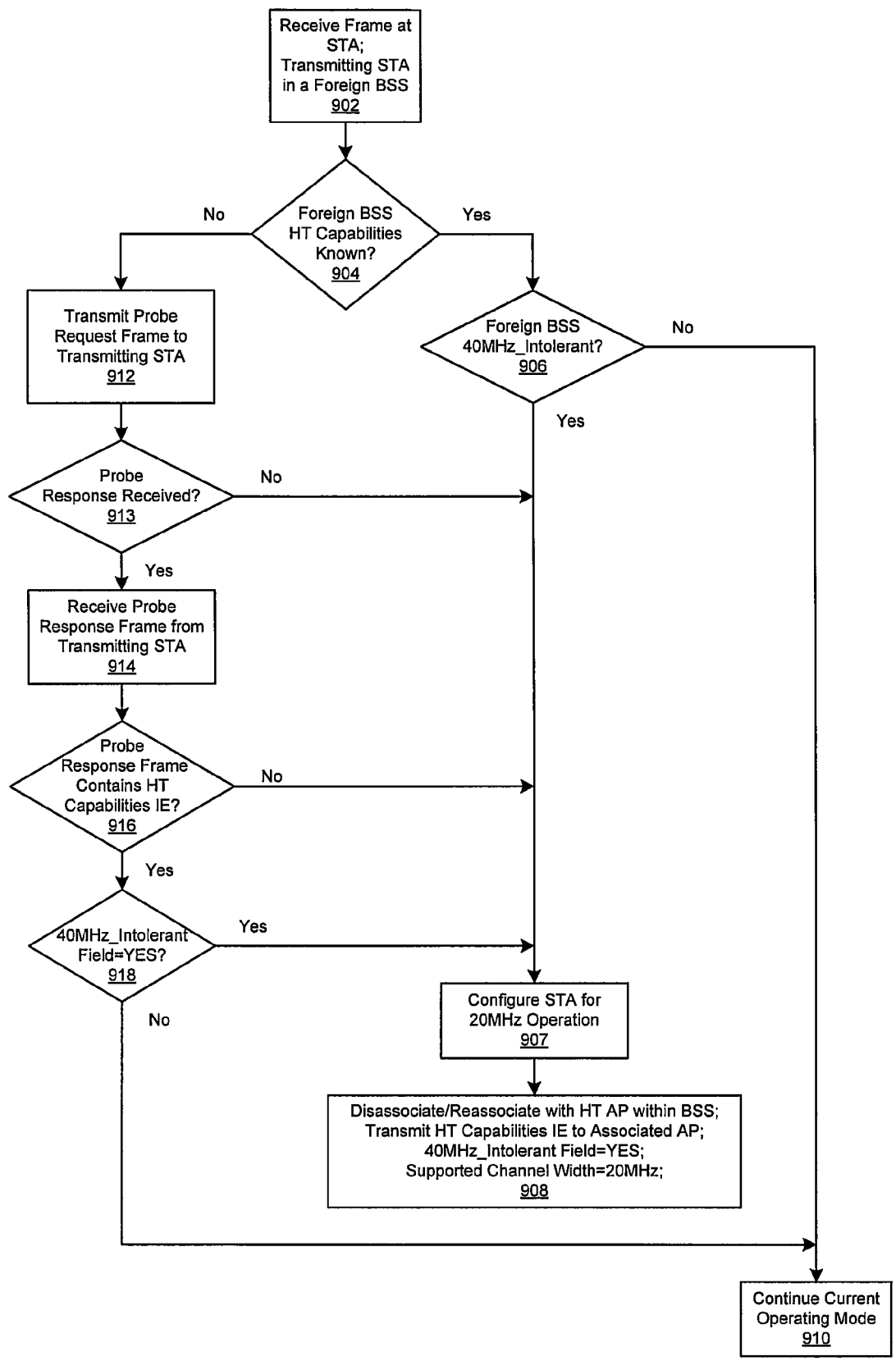
FIG. 9A is a flowchart illustrating exemplary steps for 20 MHz and 40 MHz coexistence with an OBSS with transmission of probe frames, in accordance with an embodiment of the invention.

FIG. 9A is a flowchart illustrating exemplary steps for 20 MHz and 40 MHz coexistence with an OBSS with transmission of probe frames, in accordance with an embodiment of the invention. Referring to FIG. 9A, in step 902, the receiving STA may receive a frame from a transmitting STA that may be associated with a foreign BSS. In step 904, the receiving STA may determine whether the HT capabilities for the foreign BSS are known at the receiving STA. When the HT capabilities for the foreign BSS are determined known at the receiving STA, in step 906, the receiving STA may determine whether the HT capabilities indicate that the foreign BSS is operating in a 40 MHz intolerant mode. When, in step 906, the receiving STA determines that the foreign BSS may be operating in a 40 MHz intolerant mode, in step 907, the receiving STA may be reconfigured for 20 MHz channel bandwidth operation. In step 920, the receiving STA may transmit a disassociation frame to the HT AP within the BSS in which the receiving STA is associated. The receiving STA may then send a reassociation request frame to the associated HT AP. The reassociation request frame may comprise an HT capabilities IE. The HT capabilities IE may comprise a 40 MHz_Intolerant=YES indication and a Supported_Channel_Width=20 MHz indication. When, in step 906, the receiving STA determines that the foreign BSS is not operating in a 40 MHz intolerant mode, in step 910, the receiving STA may continue operating in its current operating mode.

When in step 904, the receiving STA determines that the HT capabilities of the foreign BSS are not known to the receiving STA, in step 912, the receiving STA may transmit a probe request frame to the transmitting STA in the foreign BSS. In step 913, the receiving STA may determine whether a probe response frame has been received. When, in step 913, the receiving STA determines that a probe response frame has not been received, step 907 may follow, otherwise step 914 may follow. In step 914, the receiving STA may receive a probe response frame from the transmitting BSS within the foreign BSS. In step 916, the receiving STA may determine whether the received probe response frame comprises an HT capabilities IE. When, in step 916, the receiving STA determines that the received probe response frame does not comprise an HT capabilities IE, step 906 may follow.

When, in step 916, the receiving STA determines that the received probe response frame comprise an HT capabilities IE, in step 918, the receiving STA may determine whether the HT capabilities IE comprise a value indicating 40 MHz_Intolerant=YES. When, in step 918, the receiving STA determines that the received HT capabilities IE comprises a value indicating 40 MHz_Intolerant=YES, step 907 may follow, otherwise step 910 may follow.

Figure 9B:
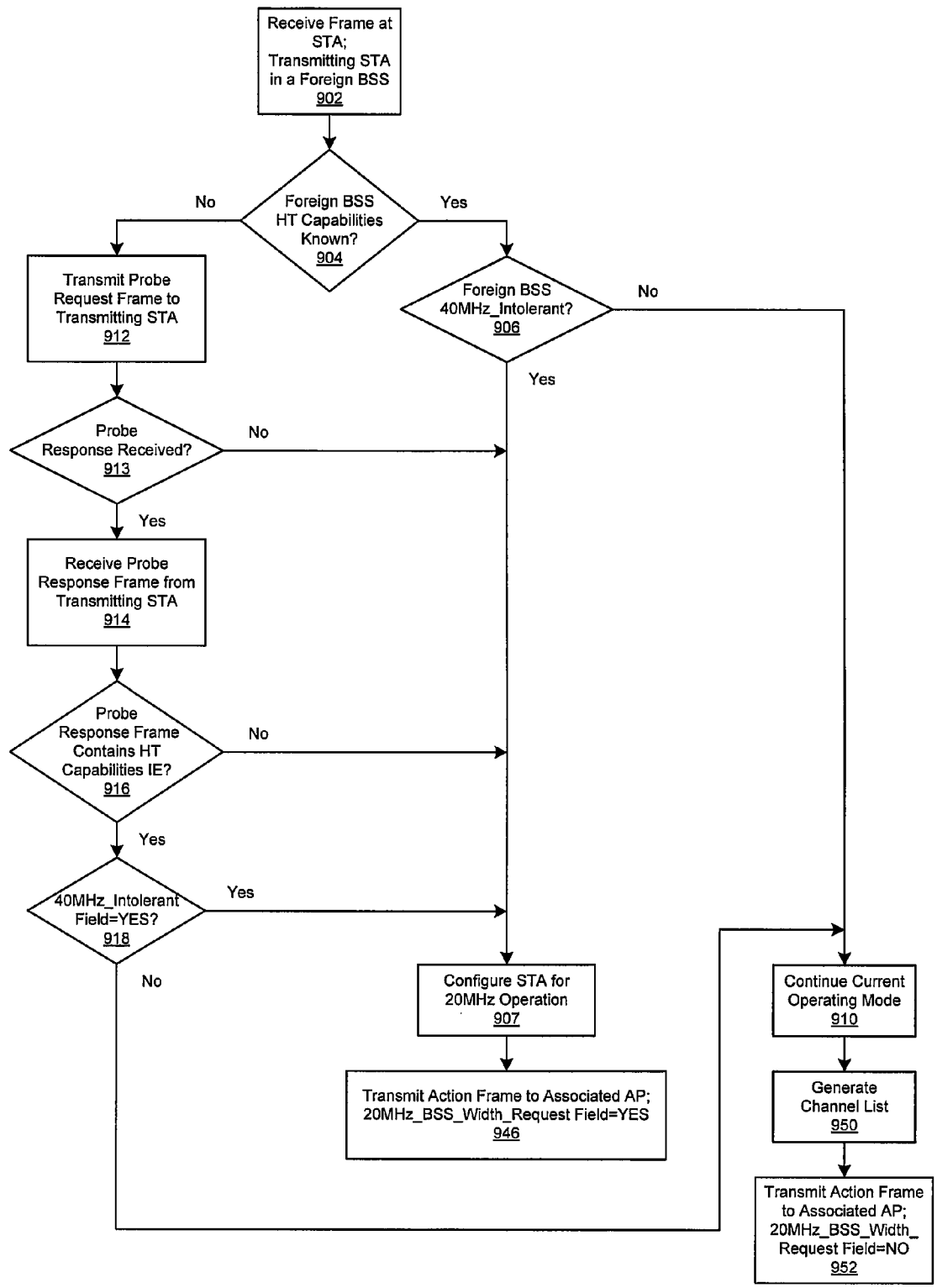
FIG. 9B is a flowchart illustrating exemplary steps for 20 MHz and 40 MHz coexistence with an OBSS with transmission of probe frames and action frames, in accordance with an embodiment of the invention.

FIG. 9B is a flowchart illustrating exemplary steps for 20 MHz and 40 MHz coexistence with an OBSS with transmission of probe frames and action frames, in accordance with an embodiment of the invention. Referring to FIG. 9B, steps 902-918 are as described in FIG. 9A. Step 946, which is substantially similar to step 346 (FIG. 3B), may follow step 907. Step 950, which is substantially similar to step 315 (FIG. 3B), may follow step 910. Step 952, which is substantially similar to step 352 (FIG. 3B), may follow step 950.

Figure 10:
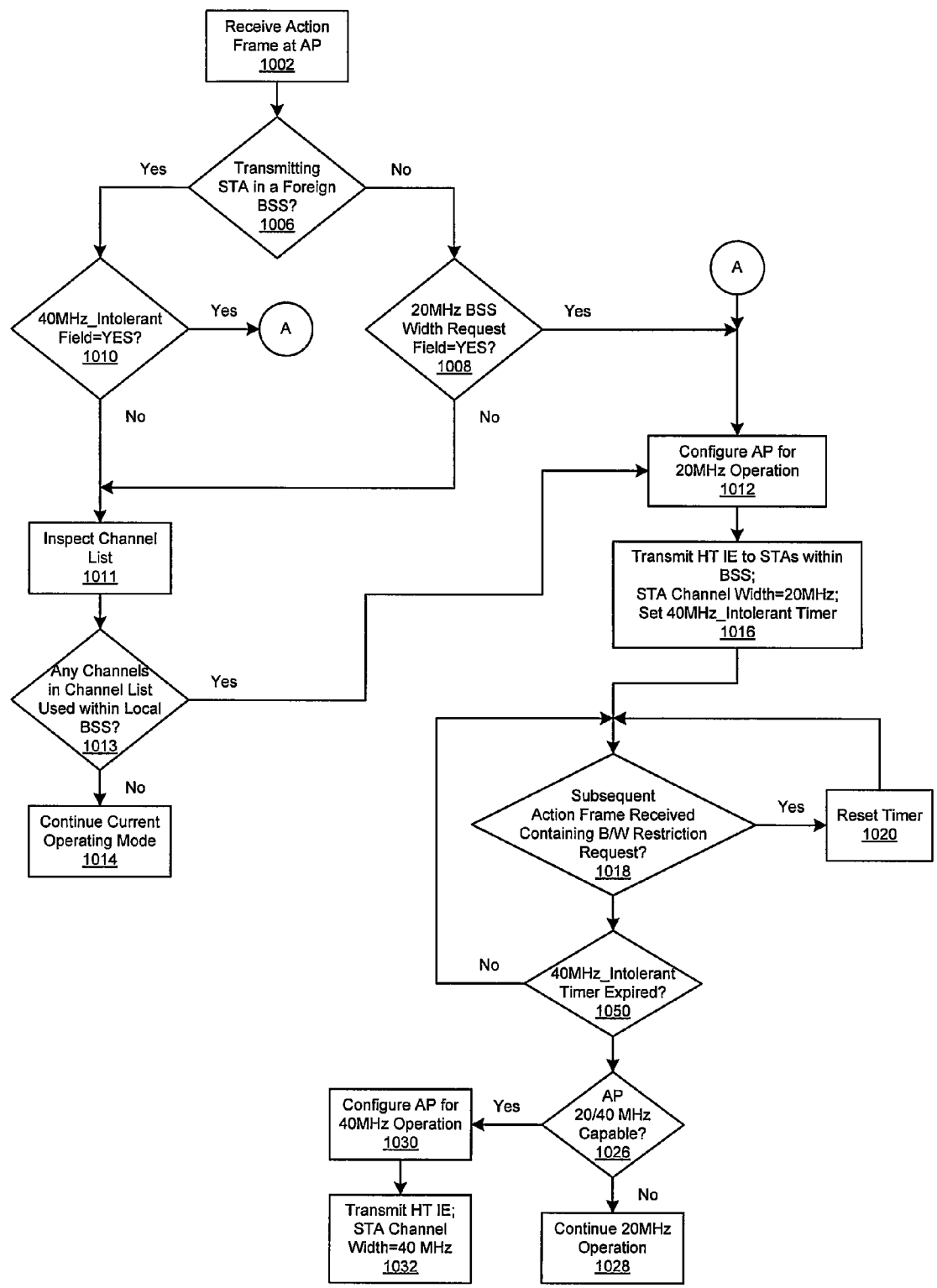
FIG. 10 is a flowchart illustrating exemplary steps for coexistence management within an OBSS, in accordance with an embodiment of the invention.

FIG. 10 is a flowchart illustrating exemplary steps for coexistence management within an OBSS, in accordance with an embodiment of the invention. Referring to FIG. 10, in step 1002, a receiving AP may receive an action frame, such as a coexistence management frame. In step 1006, the receiving AP may inspect the BSSID field within the received frame to determine whether the transmitting STA, which transmitted the frame, may be associated in a foreign BSS. When, in step 1006, the receiving AP determines that the transmitting STA is not associated in a foreign BSS, in step 1008, the receiving AP may determine whether the received frame comprises a value indicating that 20 MHz channel bandwidth operation is requested. When, in step 1008, the receiving AP determines that the received frame indicates that 20 MHz channel bandwidth operation is requested, in step 1012, the receiving AP may configure for 20 MHz channel bandwidth operation.

In step 1016, the receiving AP may transmit a management frame, for example a beacon frame, to the STAs within the BSS in which the receiving AP is associated. The transmitted management frame may comprise an HT capabilities IE. The HT capabilities IE may comprise a STA_Channel_Width=20 MHz indication. The STA_Channel_Width=20 MHz indication may enable the associated HT STAs to determine that they are to configure to support 20 MHz channel bandwidth operation. The receiving AP may set a 40 MHz_Intolerant timer.

In step 1018, the receiving AP may determine whether a subsequent frame has been received within the determined minimum time period, which contains a bandwidth (BAN) restriction request, which would cause the receiving AP to configure for 20 MHz channel bandwidth operation. When in step 1018, the receiving AP determines that a subsequent frame, which may comprise a B/W restriction request indication, has been received, in step 1020, the 40 MHz_Intolerant timer may be reset to measure a subsequent minimum time period. Step 1018 may follow.

When in step 1018, the receiving AP determines that a subsequent frame, which comprises a B/W restriction request indication, has not been received, in step 1050, the receiving AP may determine whether the 40 MHz_Intolerant timer has expired. When in step 1050, the receiving AP determines that the 40 MHz_Intolerant timer has not expired, step 1018 may follow.

When in step 1050, the receiving AP determines that the 40 MHz_Intolerant timer has expired, in step 1026, the receiving AP may determine whether it may be an HT capable AP, which may selectively utilize 20 MHz channel bandwidth operation or 40 MHz channel bandwidth operation. When in step 1026, the receiving AP determines that it is not capable of selectively utilizing 20 MHz channel bandwidth operation or 40 MHz channel bandwidth operation, in step 1028, the receiving AP may continue 20 MHz channel bandwidth operation.

When in step 1026, the receiving STA determines that it may be capable of selectively utilizing 20 MHz channel bandwidth operation or 40 MHz channel bandwidth operation, in step 1030, the receiving STA may be reconfigured for 40 MHz channel bandwidth operation. In step 1032, the receiving STA may transmit a management frame, for example a beacon frame, to the STAs within the BSS in which the receiving AP is associated. The transmitted management frame may comprise an HT capabilities IE. The HT capabilities IE may comprise a STA_Channel_Width=40 MHz indication.

When, in step 1006, the receiving AP determines that the transmitting STA may be associated in a foreign BSS, in step 1010, the receiving AP may determine whether the received frame comprises a value indicating that the foreign BSS may be operating in a 40 MHz intolerant mode. When the receiving AP determines that the received frame indicates that the foreign BSS is operating in a 40 MHz intolerant mode step 1012 may follow.

When, in step 1010, the receiving AP determines that the received frame indicates that the foreign BSS is operating in a 40 MHz intolerant mode, step 1012 may follow. When, in step 1010, the receiving AP determines that the received frame does not indicate that the foreign BSS is operating in a 40 MHz intolerant mode, in step 101 1, the receiving AP may inspect the channel list from the received frame. In step 1013, the receiving AP may determine whether any of the channels listed in the channel list are utilized within the local BSS. When, in step 1013, the receiving AP determines that there are no channels in the channel list, which are utilized in the local BSS, in step 10104, the receiving AP may continue in the current operating mode. When, in step 1013, the receiving AP determines that there are channels in the channel list, which are utilized in the local BSS, step 1012 may follow.

The receiving STA may send information within the received action frame to the HT AP within the BSS in which the receiving STA is associated when the transmitting STA is associated in a foreign BSS. In response, the HT AP may transmit an action frame to the STAs within the associated BSS based on the received foreign BSS coexistence information. The HT AP may start a coexistence management timer upon receipt of the received foreign BSS coexistence information. Upon expiration of the coexistence management timer, the HT AP may transmit a subsequent action frame, which enables the STAs within the associated BSS to utilize 20 MHz or 40 MHz channel bandwidth operation for RF channels within the channel list.

Exemplary aspects of a method and system for coexistence between 20 MHz and 40 MHz OBSSes in WLANs may comprise a receiving device, such as a WLAN station (STA) 146, which enables reception of an information frame, such as a management frame, via a wireless communication medium. The receiving device may be associated with a wireless network device group, such as a basic service set (BSS) 132. The information frame received by the receiving device may transmitted by a transmitting device, such as a transmitting access point (AP) 112, which is associated with a foreign wireless network device group, for example BSS 102. The receiving device may be reconfigured to restrict RF channel bandwidth utilized for transmitting and/or receiving signals via the wireless communication medium based on the received information frame.

The reconfiguration of the receiving device may restrict RF channel bandwidth utilized for transmitting and/or receiving signals via one or more specific RF channels, while the reconfiguration may not be performed when the receiving device receives and/or transmits signals via other RF channels. The one or more specific channel may be determined based on a channel list, which may be located within a received action frame, such as a coexistence management frame.

The receiving device may enable determination of whether the received information frame comprises capabilities information, such as an HT capabilities IE, for the transmitting device. The receiving device may be reconfigured based on one or more RF channel bandwidth restriction indications, such as a 40 MHz_Intolerant=YES indication, which are communicated via the capabilities information. The receiving device may communicate information, based on the reconfiguration and/or on the one or more RF channel bandwidth restriction indications, to at least one other device associated with the wireless network device group. For example, subsequent to reconfiguration, the receiving STA 146, associated with BSS_2 132, may perform a disassociation/reassociation frame sequence with AP_2 142. The receiving device may be reconfigured based on an absence of capabilities information within received information frame. For example, receiving STA 146 may reconfigure for 20 MHz channel bandwidth operation upon receipt of a management frame from AP_1 112, which does not comprise an HT capabilities IE.

The receiving device may enable setting of a value for a reconfiguration timer at a time instant subsequent to reconfiguration. The reconfiguration timer may measure a determined minimum time period subsequent to the reconfiguration of the receiving device in response to receipt of the information frame. The reconfiguration timer may expire after the determined minimum time period has elapsed. The receiving device may determine whether a subsequent information frame has been received prior to the expiration of the reconfiguration timer. The receiving device may enable resetting of the reconfiguration timer when: a) there is an absence of capabilities information is detected in the subsequent received information frame, or; b) specified value(s) for one or more RF bandwidth restriction indications (for example, 40 MHz_Intolerant=YES) are detected in the subsequent received information frame. Resetting of the reconfiguration timer may enable the measurement of a subsequent determined minimum time period following the reset.

The receiving device may enable performance of a subsequent reconfiguration at a time instant subsequent to the expiration of the reconfiguration timer when: a) no information frames are received at the receiving device for which capabilities information is absent, and/or; b) no information frames are received at the receiving device, which comprise specified values for one or more RF bandwidth restriction indications. The subsequent reconfiguration may restore the receiving device to an operational mode that existed prior to the configuration in response on the received information frame.

Another embodiment of the invention may provide a machine-readable storage, having stored thereon, a computer program having at least one code section executable by a machine, thereby causing the machine to perform the steps as described herein for coexistence between 20 MHz and 40 MHz overlapping basic service sets (OBSS) in wireless local area networks.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating data, the method comprising:
    receiving an information frame via a wireless communication medium at a receiving device, which is associated with a wireless network device group, wherein said information frame is transmitted by a transmitting device, which is associated with a different wireless network device group;
    determining whether said received information frame comprises capabilities information for said transmitting device; and
    reconfiguring said receiving device to restrict RF channel bandwidth utilized for transmitting and/or receiving signals via said wireless communication medium based on an absence of said capabilities information within said received information frame.

2. The method according to claim 1, comprising reconfiguring said receiving device based on one or more RF channel bandwidth restriction indications, which are communicated via said capabilities information.

3. The method according to claim 2, comprising communicating information based on one or both of said reconfiguring and/or said one or more RF channel bandwidth restriction indications, to at least one other device associated with said wireless network device group.

4. The method according to claim 1, comprising communicating information based on said reconfiguring to at least one other device associated with said wireless network device group.

5. The method according to claim 1, comprising setting a value for a reconfiguration timer at a time instant subsequent to said reconfiguration.

6. The method according to claim 5, comprising determining whether a subsequent information frame is received prior to the expiration of said reconfiguration timer.

7. The method according to claim 6, comprising resetting a value for said reconfiguration timer when one or both of the following occurs during a current time measurement period for said reconfiguration timer:
    absence of capabilities information is detected in said subsequent received information frame; and/or
    specified value(s) for one or more RF bandwidth restriction indications are detected in said subsequent received information frame.

8. The method according to claim 6, comprising performing a subsequent reconfiguring at said receiving device at a time instant subsequent to the expiration of said reconfiguration timer when one or both of the following occurs during a current time measurement period for said reconfiguration timer:
    no information frames for which capabilities information is absent are received at said receiving device; and/or
    no information frames comprising specified values for one or more RF bandwidth restriction indications are received at said receiving device.

9. The method according to claim 8, wherein said subsequent reconfiguring restores said receiving device to an operational mode that existed prior to said configuring.

10. The method according to claim 1, comprising reconfiguring said receiving device to restrict RF channel bandwidth utilized for transmitting and/or receiving signals via one or more specific RF channels.

11. A system for communicating data, the system comprising:
    one or more circuits that enable reception of an information frame via a wireless communication medium at a receiving device, which is associated with a wireless network device group, wherein said information frame is transmitted by a transmitting device, which is associated with a different wireless network device group;
    said one or more circuits enable determination of whether said received information frame comprises capabilities information for said transmitting device; and
    said one or more circuits enable reconfiguration of said receiving device to restrict RF channel bandwidth utilized for transmitting and/or receiving signals via said wireless communication medium based on an absence of said capabilities information within said received information frame.

12. The system according to claim 11, wherein said one or more circuits enable reconfiguration of said receiving device based on one or more RF channel bandwidth restriction indications, which are communicated via said capabilities information.

13. The system according to claim 12, wherein said one or more circuits enable communication of information based on one or both of said reconfiguration and/or said one or more RF channel bandwidth restriction indications, to at least one other device associated with said wireless network device group.

14. The system according to claim 11, wherein said one or more circuits enable communication of information based on said reconfiguration to at least one other device associated with said wireless network device group.

15. The system according to claim 11, wherein said one or more circuits enable setting of a value for a reconfiguration timer at a time instant subsequent to said reconfiguring.

16. The system according to claim 15, wherein said one or more circuits enable determination of whether a subsequent information frame is received prior to the expiration of said reconfiguration timer.

17. The system according to claim 16, wherein said one or more circuits enable resetting of a value for said reconfiguration timer when one or both of the following occurs during a current time measurement period for said reconfiguration timer:
   absence of capabilities information is detected in said subsequent received information frame, and/or;
   specified value(s) for one or more RF bandwidth restriction indications are detected in said subsequent received information frame.

18. The system according to claim 16, wherein said one or more circuits enable performance of a subsequent reconfiguration at said receiving device at a time instant subsequent to the expiration of said reconfiguration timer when one or both of the following occurs during a current time measurement period for said reconfiguration timer:
   no information frames for which capabilities information is absent are received at said receiving device; and/or
   no information frames comprising specified values for one or more RF bandwidth restriction indications are received at said receiving device.

19. The system according to claim 18, wherein said subsequent reconfiguration restores said receiving device to an operational mode that existed prior to said configuration.

20. The system according to claim 11, wherein said one or more circuits enable reconfiguration of said receiving device to restrict RF channel bandwidth utilized for transmitting and/or receiving signals via one or more specific RF channels.

21. A system for communicating data, the system comprising:
   one or more circuits that enable reception of an information frame via a wireless communication medium at a receiving device from a transmitting device;
   said one or more circuits enable comparison of one or more communication channel identifiers associated with said received information frame and a channel identifier list generated at said receiving device;
   said one or more circuits enable determination of whether said received information frame includes capabilities information for said transmitting device; and
   said one or more circuits enable reconfiguration of said receiving device to restrict RF channel bandwidth utilized for transmitting and/or receiving signals via said wireless communication medium based on said comparison and absence of said capabilities information within said received information frame.

22. The system according to claim 21, wherein said one or more circuits enable communication of information based on said reconfiguration to at least one other device associated with said wireless network device group.

23. The system according to claim 21, wherein said one or more circuits enable setting of a value for a reconfiguration timer at a time instant subsequent to said reconfiguring.

* * * * *